US006419176B1

(12) United States Patent
Mizuno

(10) Patent No.: US 6,419,176 B1
(45) Date of Patent: Jul. 16, 2002

(54) PRE-TENSIONER

(75) Inventor: Isamu Mizuno, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/513,187

(22) Filed: Feb. 25, 2000

Related U.S. Application Data

(60) Provisional application No. 60/121,917, filed on Feb. 26, 1999.

(51) Int. Cl.[7] .............................................. B60R 22/46
(52) U.S. Cl. ..................................................... 242/374
(58) Field of Search ............................. 242/374, 379.1; 280/806; 297/478

(56) References Cited

U.S. PATENT DOCUMENTS

| 4,442,674 A | * | 4/1984 | Fohl .......................... 242/374 |
| 4,444,010 A | * | 4/1984 | Bendler ...................... 242/374 |
| 5,190,239 A | * | 3/1993 | Yoshida et al. ............. 242/374 |
| 5,690,295 A |   | 11/1997 | Steinberg et al. ........... 242/374 |
| 5,699,976 A | * | 12/1997 | Hori .......................... 242/374 |
| 5,782,423 A | * | 7/1998 | Miller et al. ................ 242/374 |
| 5,842,344 A | * | 12/1998 | Schmid ...................... 242/374 |
| 5,875,634 A | * | 3/1999 | Wohlenberg et al. ....... 242/374 |
| 5,881,962 A | * | 3/1999 | Schmidt et al. ............. 242/374 |
| 5,924,640 A | * | 7/1999 | Hickey ....................... 242/374 |
| 6,073,874 A | * | 6/2000 | Scheel et al. ............... 242/374 |

FOREIGN PATENT DOCUMENTS

| DE | 3220498 A1 | * | 12/1983 | ................. 242/374 |
| EP | 0 680 856 A2 |   | 8/1996 |   |
| JP | 2001-63519 |   | 3/2001 |   |
| JP | 2001-151077 |   | 5/2001 |   |
| WO | WO 95/27638 A1 |   | 10/1995 |   |
| WO | WO 96/25310 A2 |   | 8/1996 |   |

* cited by examiner

Primary Examiner—John M. Jillions
(74) Attorney, Agent, or Firm—Foley & Lardner

(57) ABSTRACT

To provide a pre-tensioner which can effectively use ignition pressure of a gas generator and can be constructed in a compact form as a whole and have lighter weight, a pre-tensioner 10 is mounted outside of a side wall 50 of the frame 2 by a base 41. A hexagonal head portion 4d of a reel 4 penetrates a base 41. Fixed to the outer periphery of the hexagonal head portion 4d is a pinion 23. The pinion 23 is provided with external teeth 24 uniformly formed around the periphery thereof. A ring gear 30 is disposed to surround the pinion 23. The ring gear 30 has internal teeth 31 engageable with the external teeth 24 of the pinion 23. The ring gear 30 has levers 32, 33 projecting outwardly, which are formed on the outer periphery of the ring gear 30 at predetermined interval. The lever 32 of the ring gear 30 is substantially in contact with the head ball 20-15 within the pipe 21.

13 Claims, 27 Drawing Sheets

(a)

(b)

(a)

(b)

(c)

(A)

(B)

(A)

(B)

(A)

(B)

(A)

(B)

PRE-TENSIONER

This application claims priority from Provisional application Ser. No. 60/121,917, filed Feb. 26, 1989.

1. FIELD OF THE INVENTION

The present invention relates to a pre-tensioner which rapidly rotates a take-up shaft of a seat belt retractor in the belt take-up direction, the pre-tensioner being incorporated in the seat belt device for restraining an occupant to a seat of a vehicle. More particularly, the present invention relates to a pre-tensioner which can securely impart pre-tension on the belt. The present invention also relates to a pre-tensioner which can effectively use pressure developed by a gas generator or to a pre-tensioner which can be constructed in a compact form as a whole and have lighter weight.

2. BACKGROUND OF THE INVENTION

Among seat belt devices installed in vehicles such as automobiles, a seat belt device of a type having a pre-tensioner has been multiplied these days. Such a pre-tensioner rapidly rotates a reel (take-up shaft), on which a seat belt is wound, in the belt take-up direction when a vehicle comes into collision in order to cancel the loosening on the wound belt and impart tension on the belt. In a typical pre-tensioner, powder is ignited according to a signal outputted in the event of the vehicle collision and a reeling mechanism is driven by gas pressure developed by the ignition.

One of such conventional pre-tensioners is disclosed in Japanese Patent Unexamined Publication No. 05-162614.

The pre-tensioner is provided with a pinion fixed to a belt take-up shaft. The pinion has external teeth formed on the outer periphery thereof.

A ring-like pulley separately from the pinion is arranged outside the external teeth of the pinion. The pulley has internal teeth formed on the inner periphery. The internal teeth of the pulley are capable of engaging the external teeth of the pinion. The pulley is accommodated in a housing and is held by pins within the housing. In a state where the pulley is held by the pins, a predetermined clearance between the internal teeth of the pulley and the external teeth of the pinion is ensured. The terminal end of a rope is attached to the outer periphery of the pulley. The rope near the terminal end is wound on the outer periphery of the pulley for several full circles. The start end of the rope is secured to a piston of a power source (gas generator). The piston slides within a cylinder extending straight outside of the housing when the gas generator ignites the powder.

The operation of the conventional pre-tensioner is as follows.

Before the operation of the pre-tensioner, the pulley is held by the fixed pins in a position within the housing where the internal teeth of the pulley and the external teeth of the pinion are not engaged. Therefore, the take-up shaft can freely rotate. As the gas generator is actuated in this state, however, the piston is pushed by gas generated from the gas generator and thus slides within the cylinder, so the rope secured to the piston is pulled. As the rope is pulled, force is exerted on the pulley so as to shear the fixed pins, thereby canceling the holding of the pulley. As a result of this, the pulley on which the rope is wound starts to rotate and move so that the internal teeth of the pulley engages the external teeth of the pinion. Because of this engagement, the rotation of the pulley is transmitted to the pinion and the take-up shaft rotates at the same time as the rotation of the pinion, thereby imparting pre-tension on the belt.

However, the aforementioned pre-tensioner has the following problems:

(1) Since the rope is employed as a member for pulling the pulley, the casing and cylinder must have openings for introducing the rope. There is a problem that the force for biasing the piston becomes weaker because a part of gas from the gas generator leaks through the openings.

(2) Since the cylinder for pulling the rope extends straight outside the casing, the size and weight of the pre-tensioner as a whole are increased.

Another conventional example will be explained.

FIG. 17(a) is an exploded perspective view of the pre-tensioner disclosed in PCT International Publication No. WO95/27638 and FIG. 17(b) is a perspective view showing the details of a drive wheel.

The pre-tensioner comprises a pair of drive wheel halves 103, 104 attached to a take-up shaft 101 for a seat belt as shown in FIG. 17(a). The drive wheel half 104 is secured to the take-up shaft 101. The drive wheel half 103 is assembled to the take-up shaft 101 via the gear 106. Both the drive wheel halves 103, 104 form together a drive wheel 105 as shown in FIG. 17(b) by arranging them to confront to each other. The drive wheel halves 103, 104 are provided with a plurality of concavities 103a, 104a circumferentially formed in the respective confronting surfaces. When the drive wheel halves 103, 104 are arranged to confront to each other, the concavities 103a, 104a form cup-like (hemispheric) concavities 100. Also formed between the drive wheel halves 103 and 104 is a groove 110.

Disposed between the drive wheel halves 103, 104 is a sword box 114. The sword box 114 is attached to a retractor housing (not shown) as well as a cup (casing) 112. The sword box 114 is provided with projecting guide plates 116, 117. The guide plates 116, 117 are positioned in the groove 110 of the drive wheel 105.

Disposed inside the cup 112 is a U-like tube 118. The tube 118 is positioned to surround the sword box 111. The tube 118 has a notch-like opening 118a formed therein to confront a space between the guide plates 116, 117. Parts of the periphery of the drive wheel 105 enter into the opening 118a.

Disposed on one end (proximal end) of the tube 118, the right upper end in the drawing, is a gas generator 115. The other end (distal end) of the tube 118 is fitted in a throat portion 119 formed in the cup 112. Accommodated in the tube 118 are mass balls 120 for driving the drive wheel 101. The mass balls 120 are a plurality and series of spheres. The mass balls 120 have a piston 121 on the proximal side (the side near the gas generator 115).

The works and problems of the aforementioned pre-tensioner will be described with reference to FIGS. 16(a) through 16(c).

FIGS. 16(a) through 16(c) are front views schematically showing portions surrounding the drive wheel 105 of the conventional pre-tensioner of FIG. 17(a). FIG. 16(a) is a view showing the state before the actuation of the pre-tensioner, FIG. 16(b) is a view showing the state of the normal actuation of the pre-tensioner, and FIG. 16(c) is a view showing the state of the abnormal actuation of the pre-tensioner.

In the state shown in FIG. 16(a) (before the actuation), the head mass ball 120 is not in contact with the drive wheel 105 so that the drive wheel 105 and the take-up shaft 101 can freely rotate. Therefore, no clutch mechanism is required between the drive wheel 105 and the take-up shaft 101.

As the gas generator 115 (FIG. 17(a)) is actuated in the event of an emergency, generated gas presses the mass balls 120 in the tube 118 toward the bottom in the drawing. Thus, the head mass ball 120 advances to the opening 118a and comes in contact with the side of one of the teeth 105a of the drive wheel 105 which is entered into the opening 118a. At this point, the mass ball 120 exerts force in a direction of arrow C, rotating the drive wheel 105.

Since each concavity 105b between the adjacent teeth 105a is formed hemispheric corresponding to the dimension of the mass balls 120, the concavities 105b and the mass balls 120 are engaged in regular order so that the drive wheel 105 rotates. At the same time as the rotation of the drive wheel 105, the take-up shaft 101 rotates to wind up the belt in the belt take-up direction.

In this pre-tensioner, however, the rotation of the drive wheel 105 and the take-up shaft 101 is sometimes not secured. That is, as shown in FIG. 16(c), there is a possibility that the mass ball 120 pressed from the tube 118 collides with one of the summits X of the teeth 105a of the drive wheel. At this point, the force from the mass ball 120 to the drive wheel 105 acts in a direction of arrow D, that is, in the direction toward the axis of the drive wheel 105. In this case, the force of a torque of the drive wheel 105 created by mass ball 120 is reduced, so the efficiency of retracting the belt is considerably reduced. This means that the operation efficiency of the pre-tensioner disclosed in WO95/27638 is unstable.

The present invention was made in order to solve the problem and the object of the invention is to provide a pre-tensioner which can securely impart pre-tension on the belt, a pre-tensioner which can effectively use ignition pressure of a gas generator or a pre-tensioner which can be constructed in a compact form as a whole and have lighter weight.

SUMMARY OF THE INVENTION

In order to solve the above-described problem, a pre-tensioner of the present invention is a pre-tensioner which rotates a take-up shaft of a seat belt retractor in the belt take-up direction to impart pre-tension on a belt in case of emergency, the pre-tensioner comprising: a gas generator; a series and plurality of driving members which are accelerated by gas from the gas generator; a passage for guiding the driving members; a first rotational member having a plurality of driving points (levers or the like) which are pressed by some of the driving members to receive a driving force; a second rotational member fixed to the take-up shaft; and a clutch mechanism disposed between the first rotational member and the second rotational member, wherein the clutch mechanism is not coupled before the pre-tensioner is actuated, while as the first rotational member rotates when the pre-tensioner is operative (such as in a vehicle collision), the clutch mechanism is coupled, and wherein the head one of the driving members is substantially in contact with one of the driving points of the first rotational member.

When the pre-tensioner is inoperative (the normal state), the clutch mechanism is not coupled so that the first rotational member and the second rotational member are not coupled. Therefore, the second rotational member and the take-up shaft operate independently of the pre-tensioner.

When the pre-tensioner is operative, the gas generator ignites to accelerate the driving members so that the head one of the driving members presses the lever of the first rotational member. Since the head driving member is substantially in contact with the driving point of the first rotational member, the driving point is securely pressed. As the lever is pressed, the clutch mechanism is coupled so that the second rotational member rotates. According to the rotation of the second rotational member, the take-up shaft rotates to wind up the belt.

Since the head driving member is substantially in contact with the driving point of the first rotational member, the driving point of the first rotational member can be pressed just after the ignition of the gas generator. This securely prevents incorrect engagement between the driving member and the first rotational member, thereby securing the operation of the pre-tensioner. The expression "substantially in contact with" means that there may be a space not harming the operation between the head driving member and the driving point of the first rotational member.

In the present invention, the second rotational member may be a pinion having external teeth, the first rotational member may be a ring gear having internal teeth engageable with the external teeth of the pinion and having the levers on the outer periphery thereof, and the clutch mechanism may engage the internal teeth of the ring gear with the external teeth of the pinion so that the accelerated driving members press the lever of the ring gear to move the ring gear.

The transmission of the rotation from ring gear to the pinion speeds up the rotation of the pinion. No expensive part is employed, thereby facilitating the structure of the device as a whole and reducing the production cost.

Also in the present invention, the driving members are preferably spherical bodies (balls), and the passage is preferably in a pipe-like shape and is bent.

Accordingly, the passage of the driving members can be bent. The passage may be bent two- or three-dimensionally, reducing the size of the pre-tensioner. The degree of freedom for design is improved as compared to the conventional one having a straight pipe. The driving members may be connected like a string of beads or may be separated.

In the present invention, further, the bottom one (nearest to the gas generator) of the driving members preferably has a sealing function for preventing gas leakage toward the head one, and wherein the other driving members are preferably relatively loosely fitted in the passage.

Since the gas is sealed, the efficiency of the gas is improved. Because the other driving members are loosely fitted, the driving members can smoothly move.

BRIEF EXPLANATION OF THE DRAWINGS

FIG. 15(a) is a view showing the state before the ignition of the gas generator, FIG. 15(b) is a view showing the state just after the ignition of the gas generator, and FIG. 15(c) is a view showing the state where the ball is subjected to the gas pressure and thus deforms.

FIG. 16(a) is a view for explaining the state before the actuation of the pretensioner, FIG. 16(b) is a view for explaining the state of the normal actuation of the pretensioner, and FIG. 16(c) is a view for explaining the state of the abnormal actuation of the pre-tensioner.

DETAILED DESCRIPTION OF THE PREFERRED EMBODIMENTS

Hereinafter, the present invention will be described with reference to the drawings.

Figure 1:
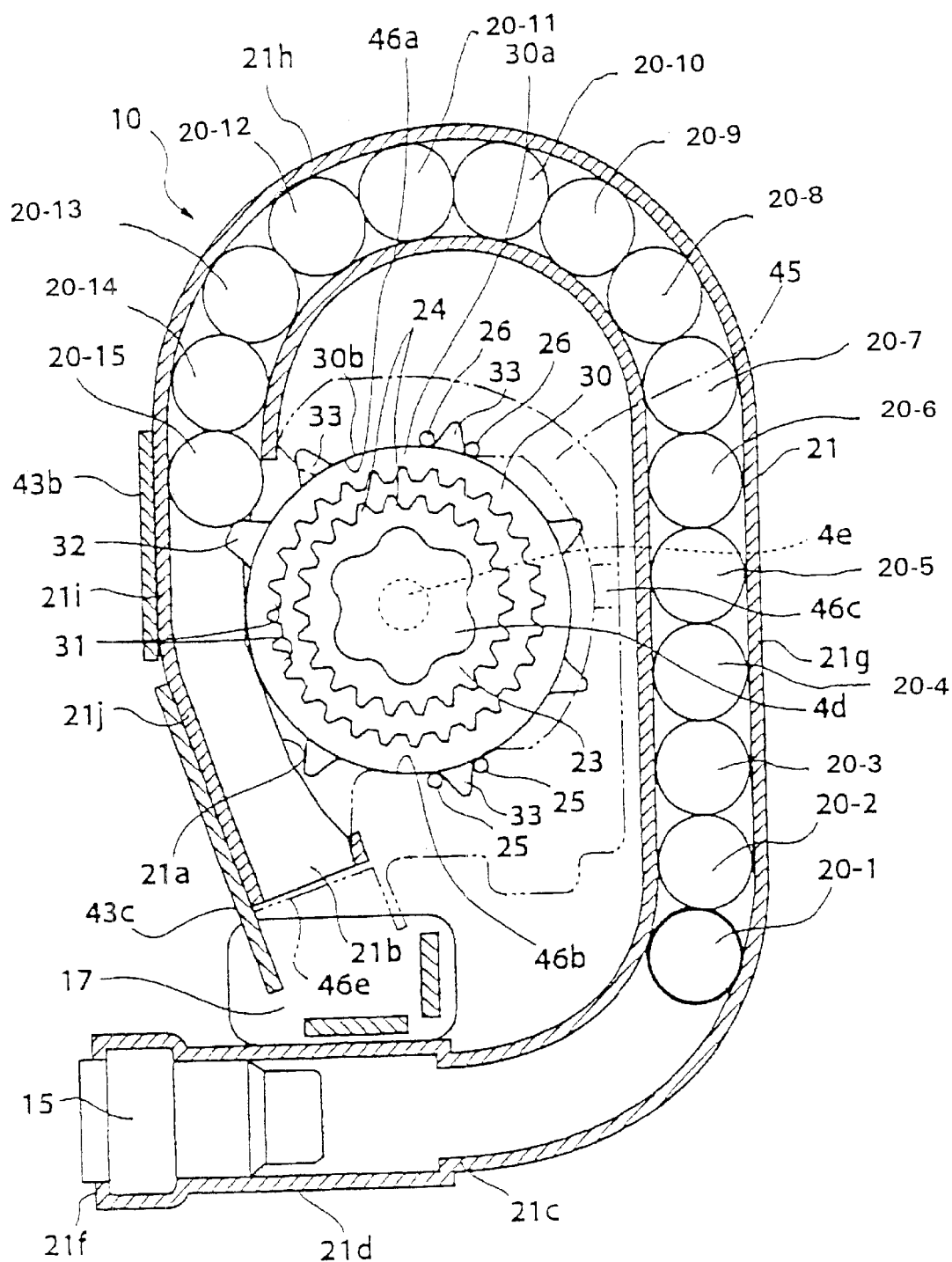
FIG. 1 is a front sectional view showing the state before the actuation of the pre-tensioner described in a first embodiment.
Figure 2:
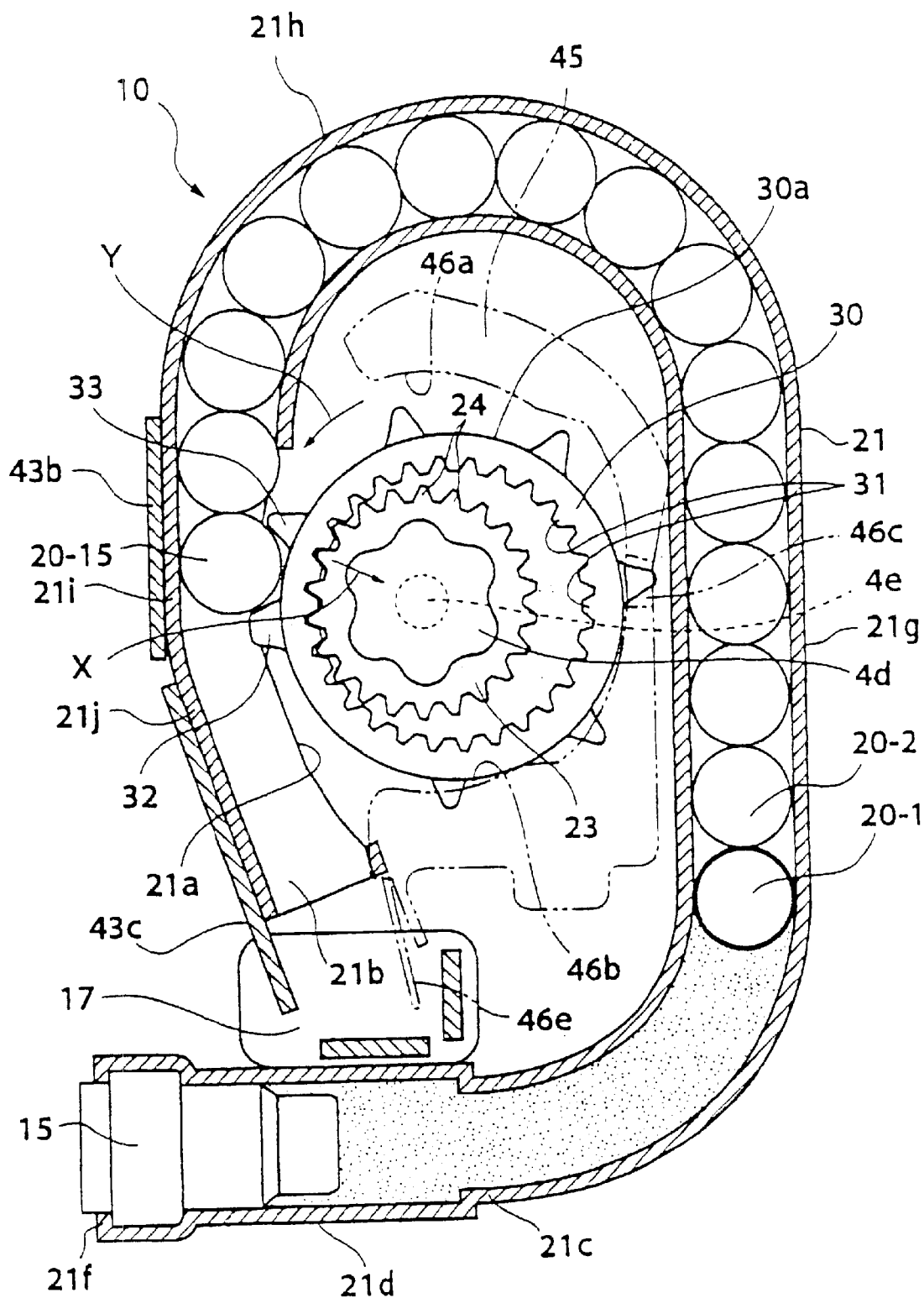
FIG. 2 is a front sectional view showing the state just after the ignition of the gas generator of the pre-tensioner according to the first embodiment.
Figure 3:
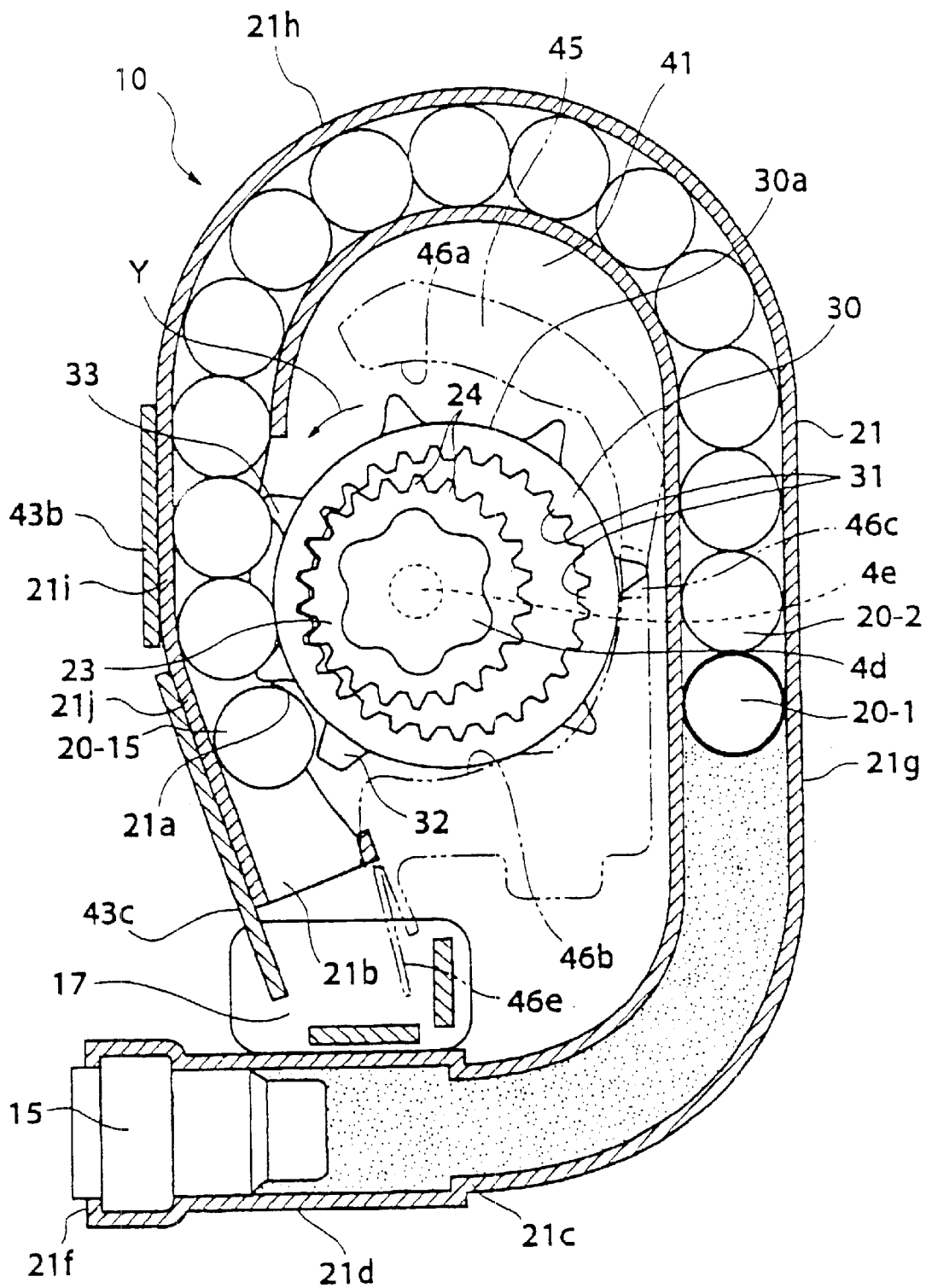
FIG. 3 is a front sectional view showing the state just after the beginning of the belt taking up of the pre-tensioner according to the first embodiment.
Figure 4:
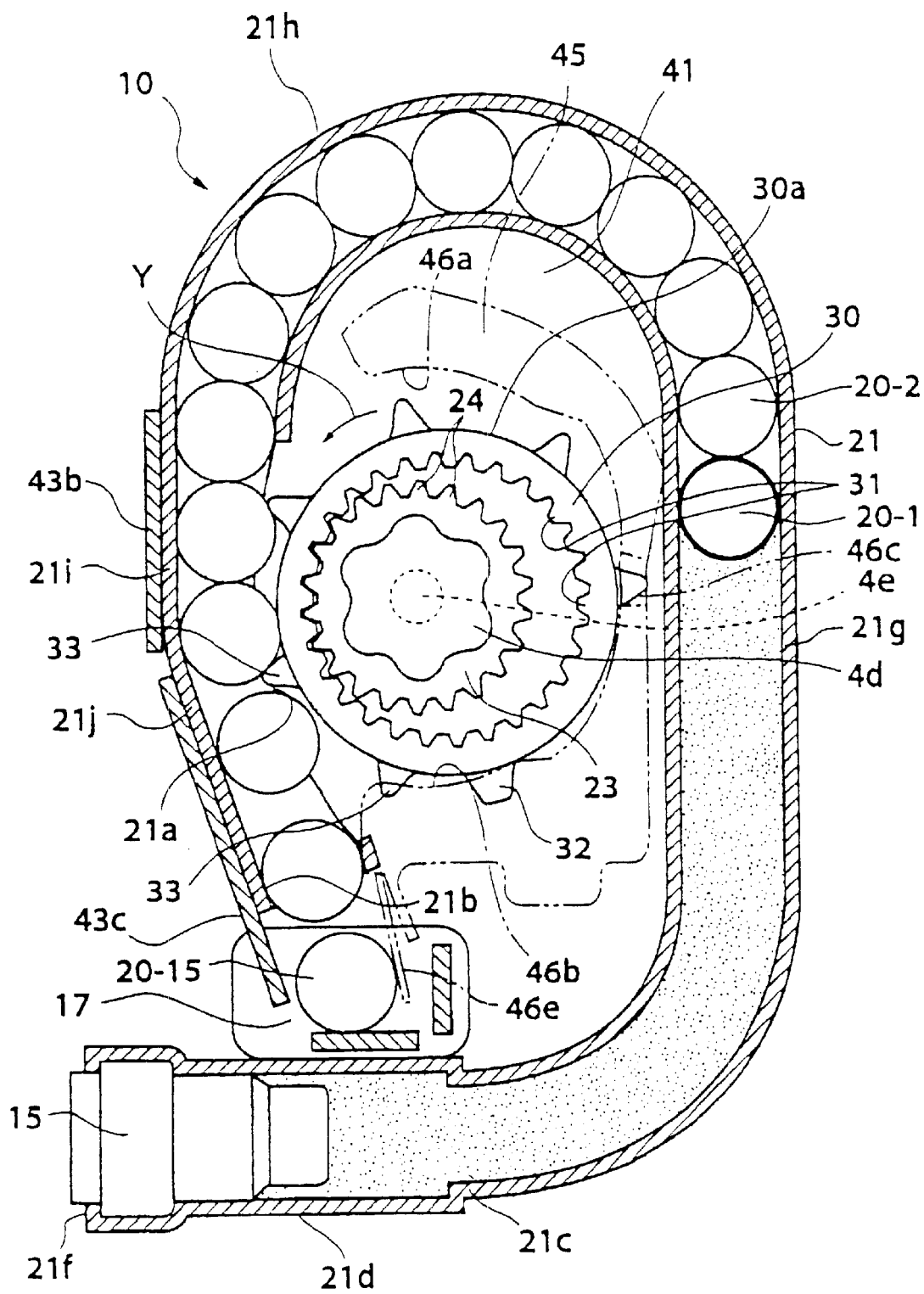
FIG. 4 is a front sectional view showing the state during the taking-up of the belt of the pre-tensioner according to the first embodiment.

FIGS. 1 through 4 are views showing the construction of a pre-tensioner according to a first embodiment of the present invention and also showing the movements for its operation. FIG. 1 is a front sectional view showing the state before the actuation of the pre-tensioner. FIG. 2 is a front sectional view showing the state just after the ignition of a gas generator. FIG. 3 is a front sectional view showing the state just after the beginning of belt taking-up. FIG. 4 is a front sectional view showing the state during the belt winding.

Figure 5:
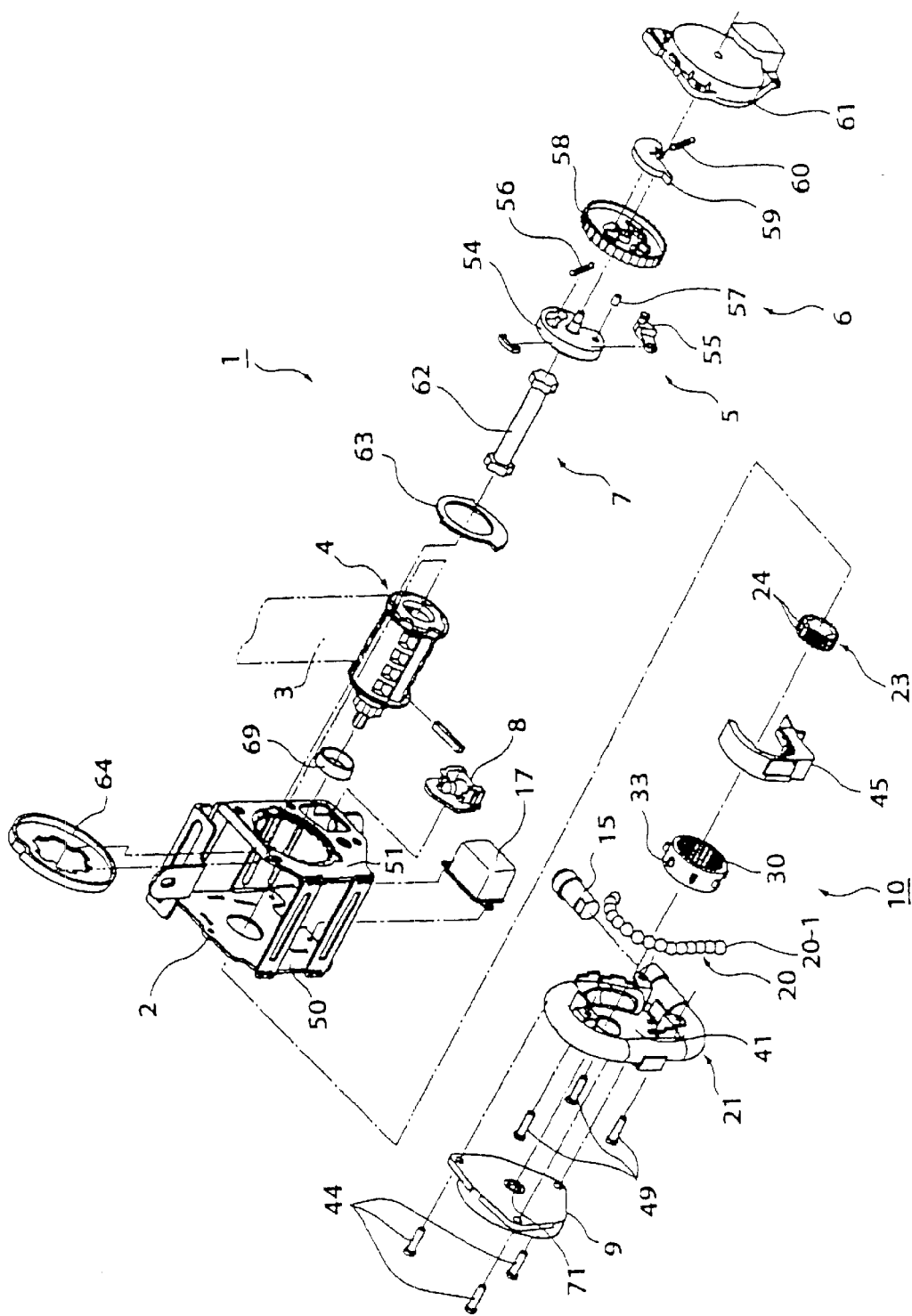
FIG. 5 is an exploded perspective view showing the general construction of the seat belt retractor as described in the first embodiment.
Figure 6:
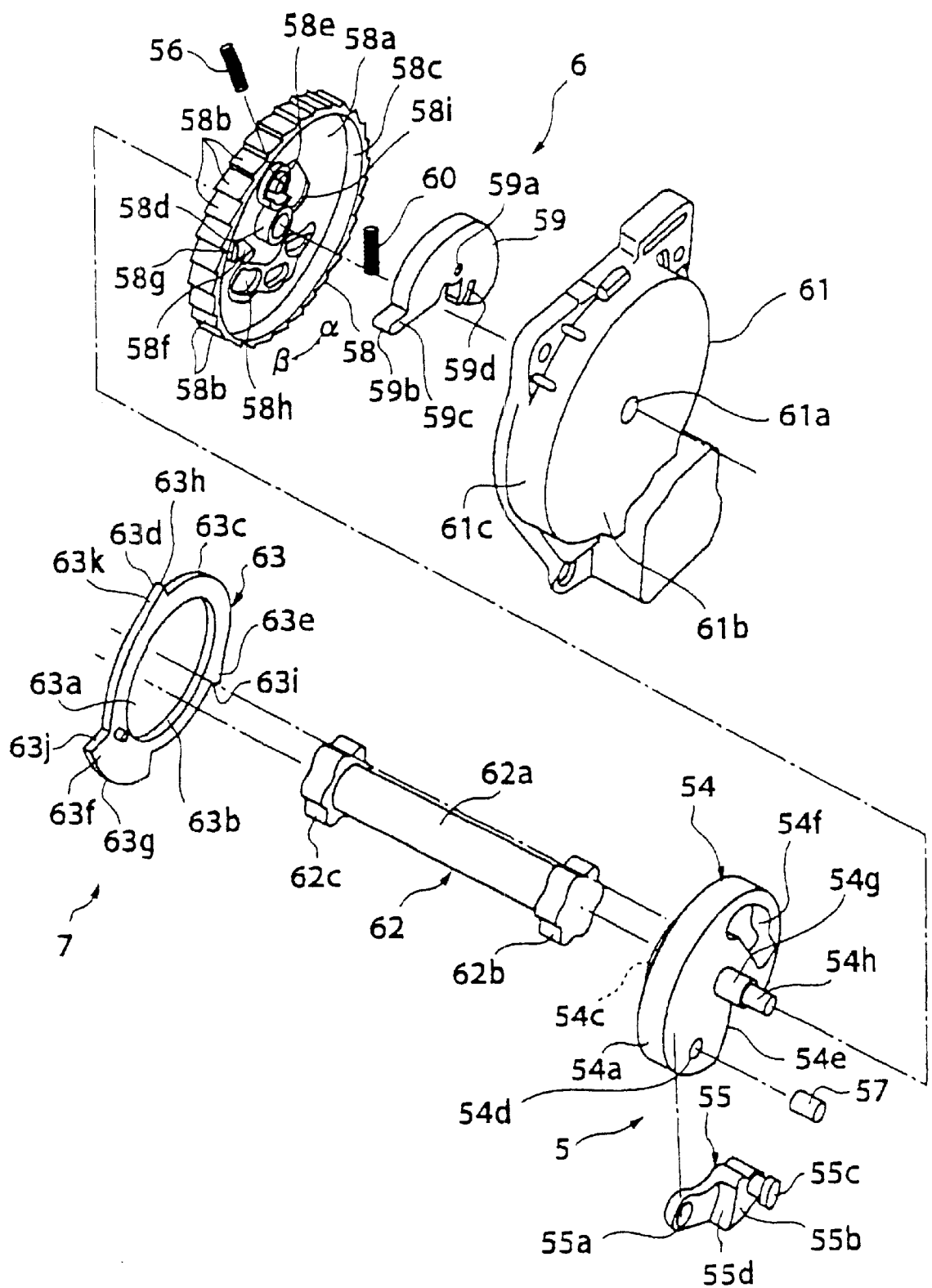
FIG. 6 is a partially enlarged view showing an emergency locking mechanism and an EA mechanism shown in FIG. 5 according to the first embodiment.
Figure 7:
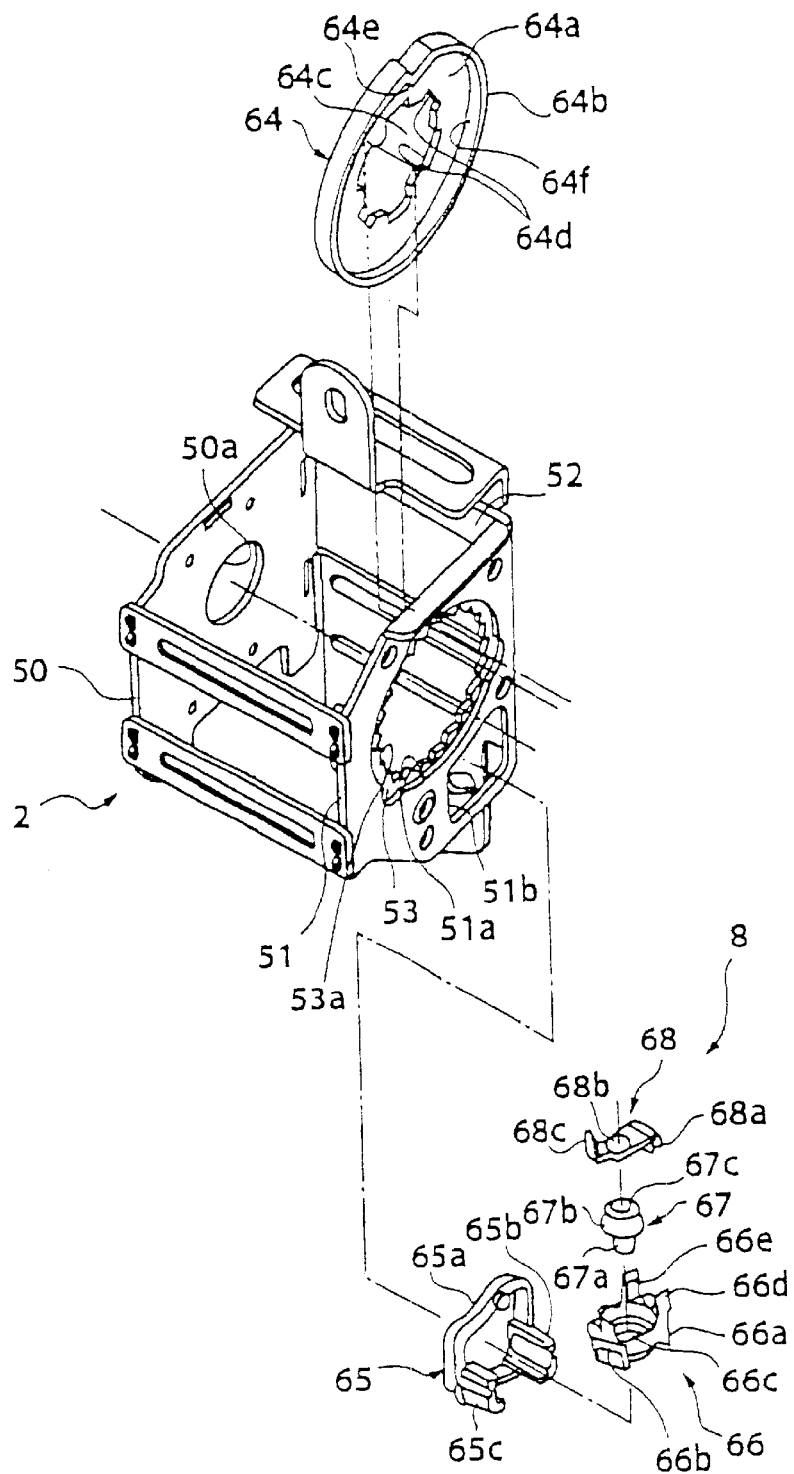
FIG. 7 is a partially enlarged view showing a frame and parts surrounding the frame of the retractor shown in FIG. 5 according to the first embodiment.
Figure 8:
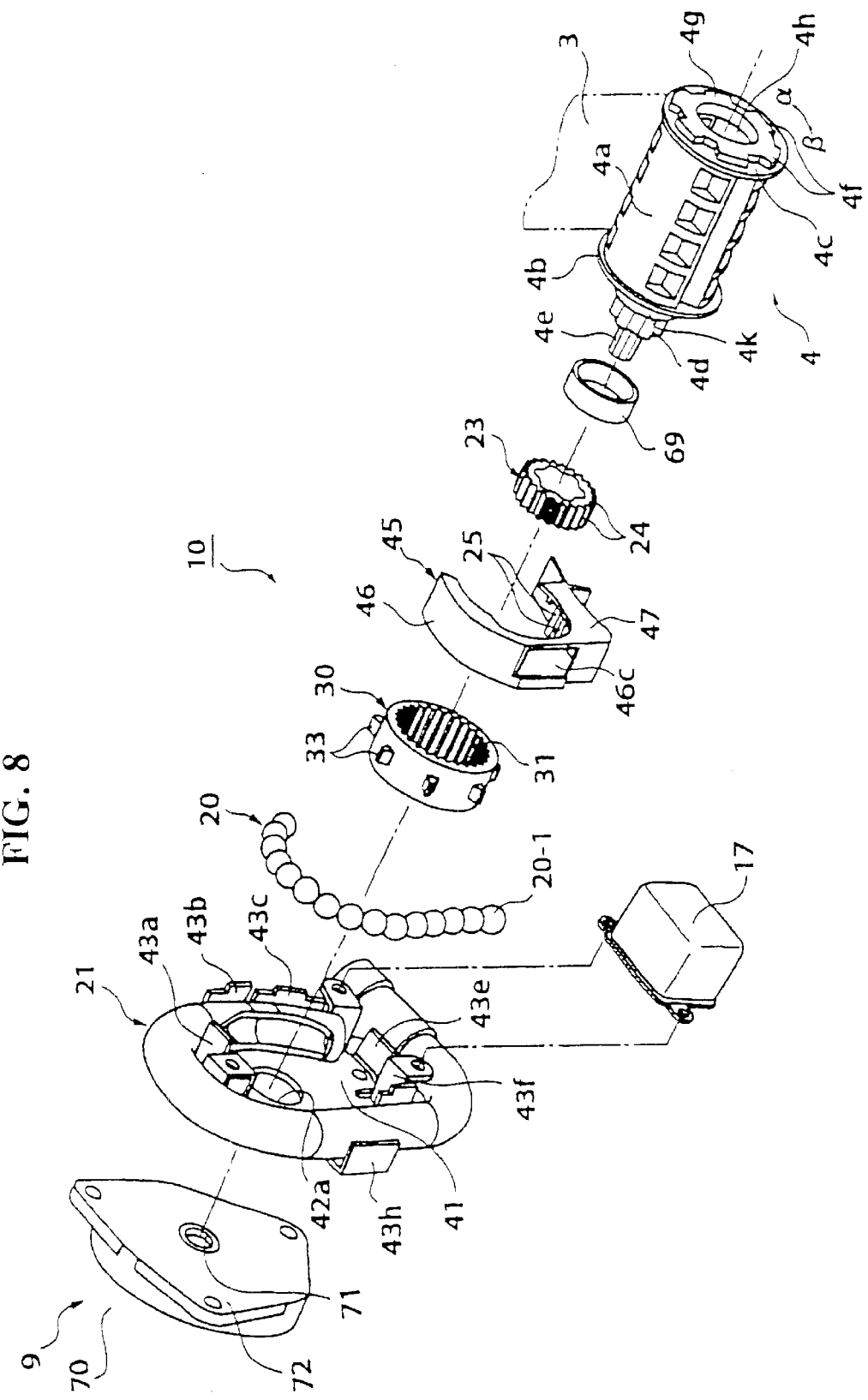
FIG. 8 is a partially enlarged view showing the pre-tensioner of the retractor 60 shown in FIG. 5 according to the first embodiment.
Figure 9:
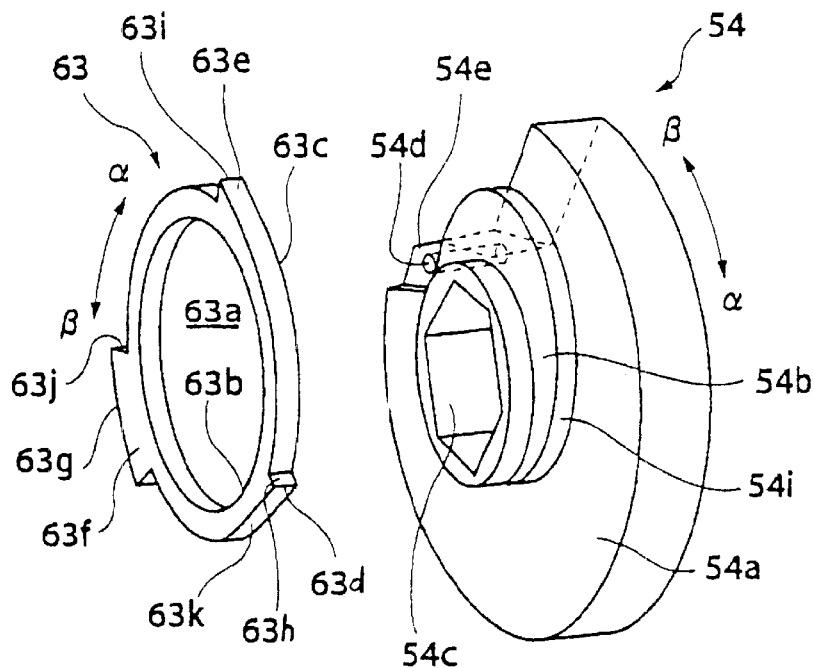
FIGS. 9(a), 9(b) are partially enlarged views showing a part of the EA mechanism of the retractor shown in FIG. 5 and FIG. 6 according to the first embodiment.
Figure 9:
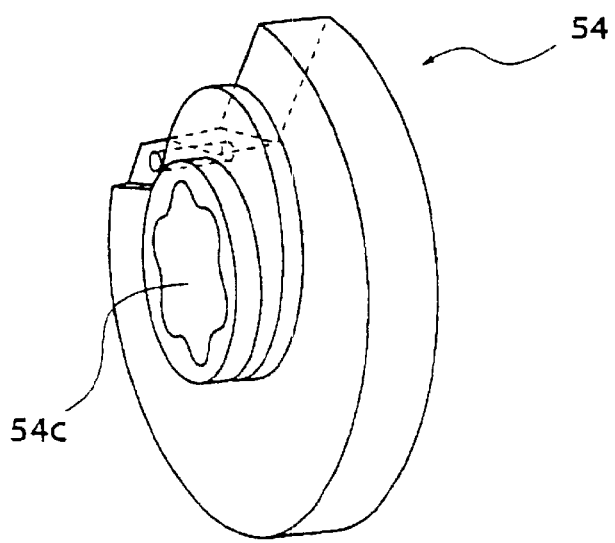
Figure 10:
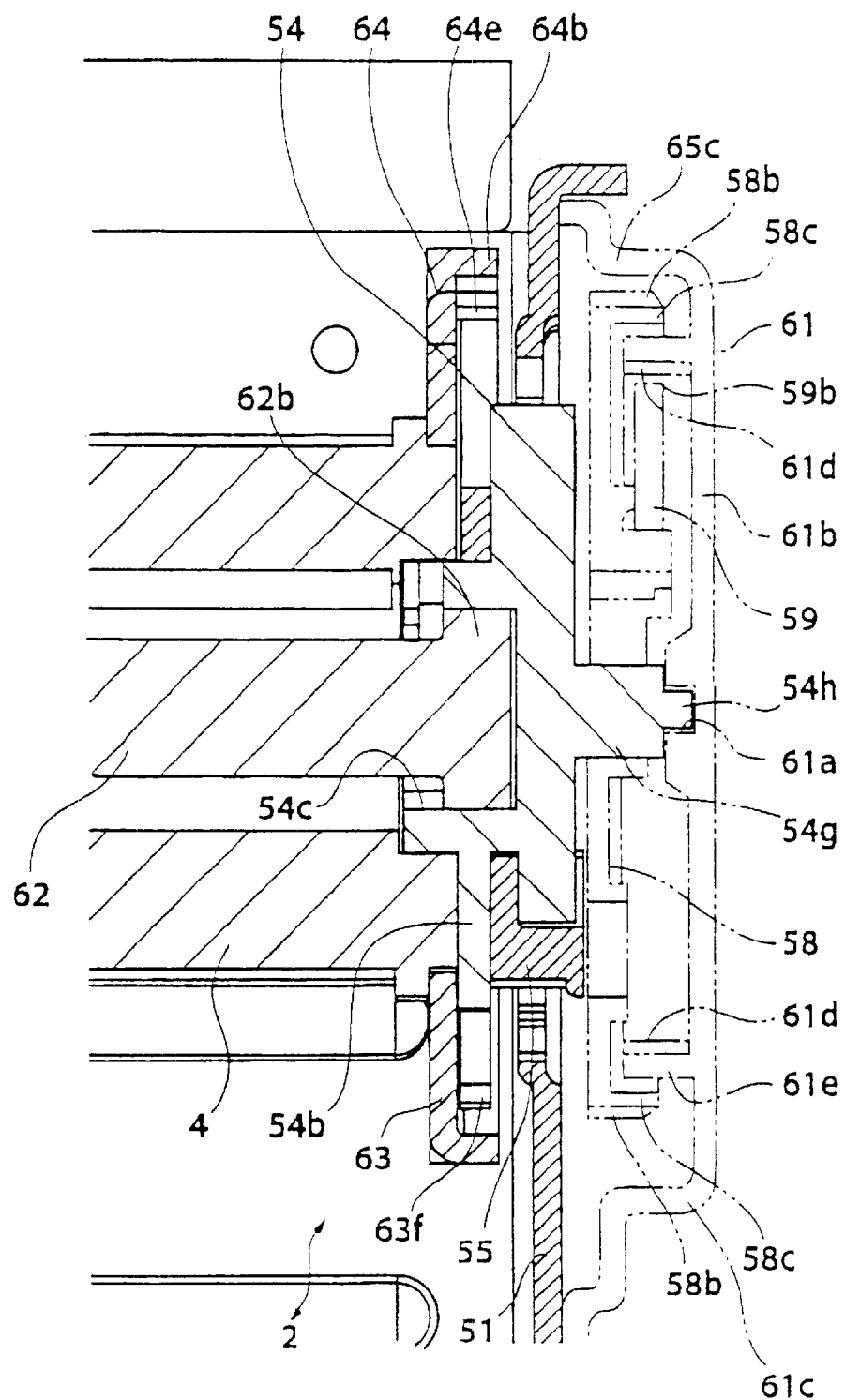
FIG. 10 is a partially sectional view showing the EA mechanism in the assembled state of the retractor according to the first embodiment.
Figure 11:
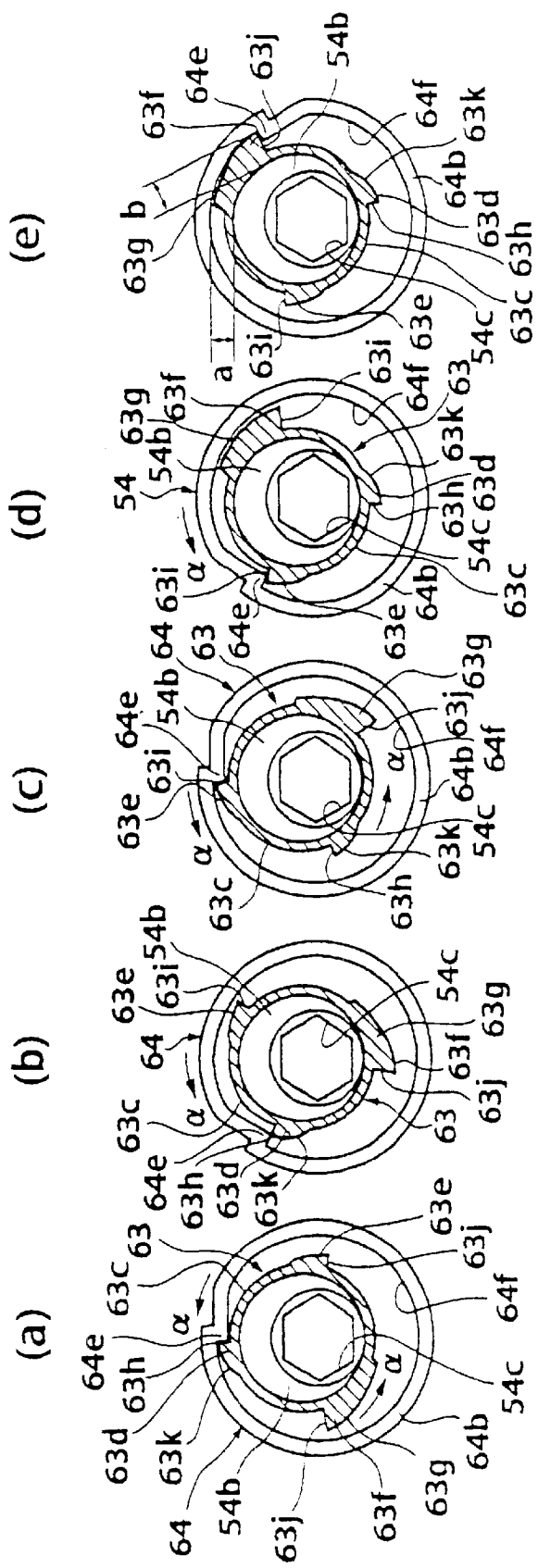
FIGS. 11(a) through 11(e) are views for explaining the operation of the EA mechanism according to the first embodiment.
Figure 12:
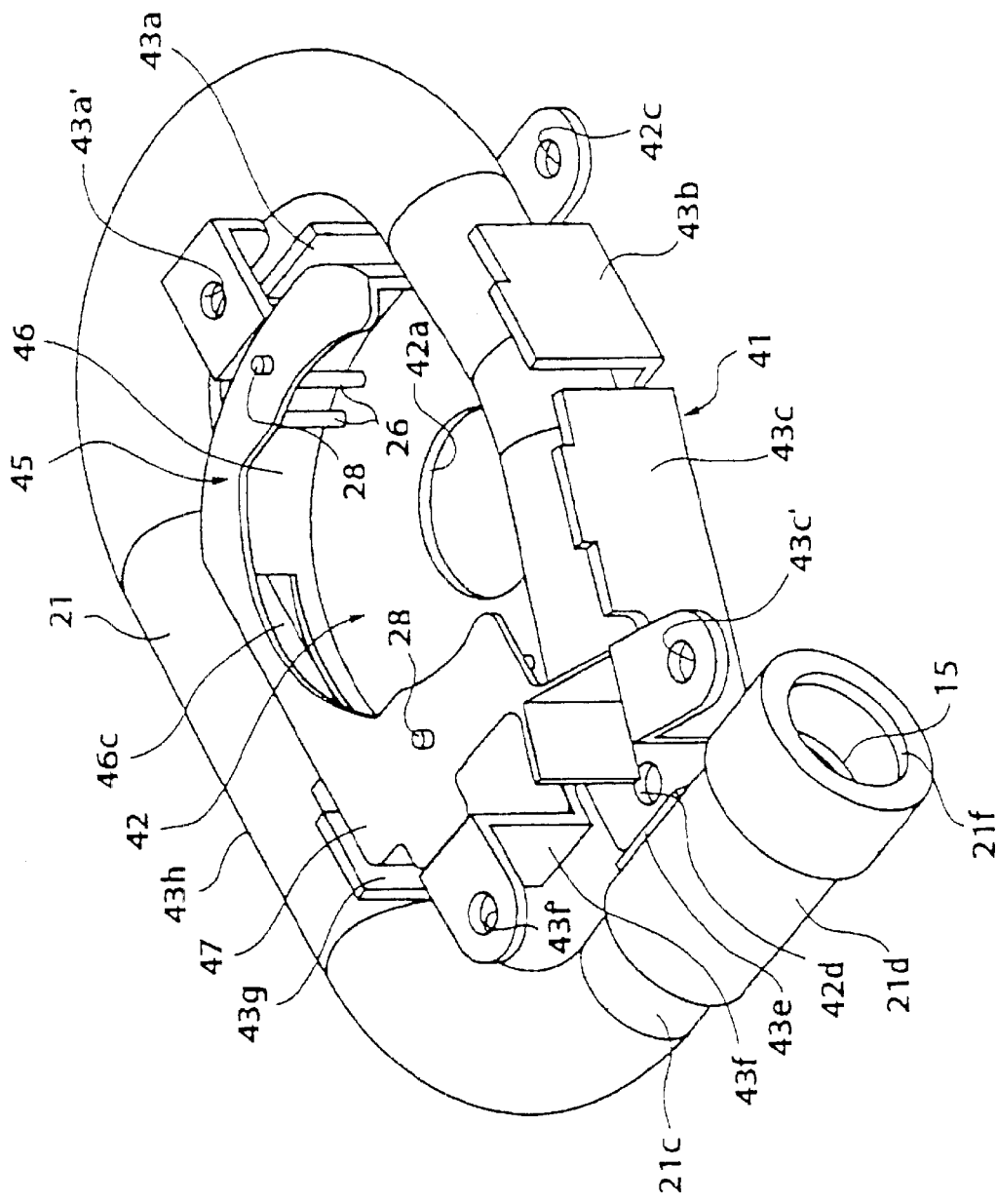
FIG. 12 is a perspective view showing the detail of a pipe, a base, and a gear holder of the pre-tensioner according to the first embodiment.
Figure 13:
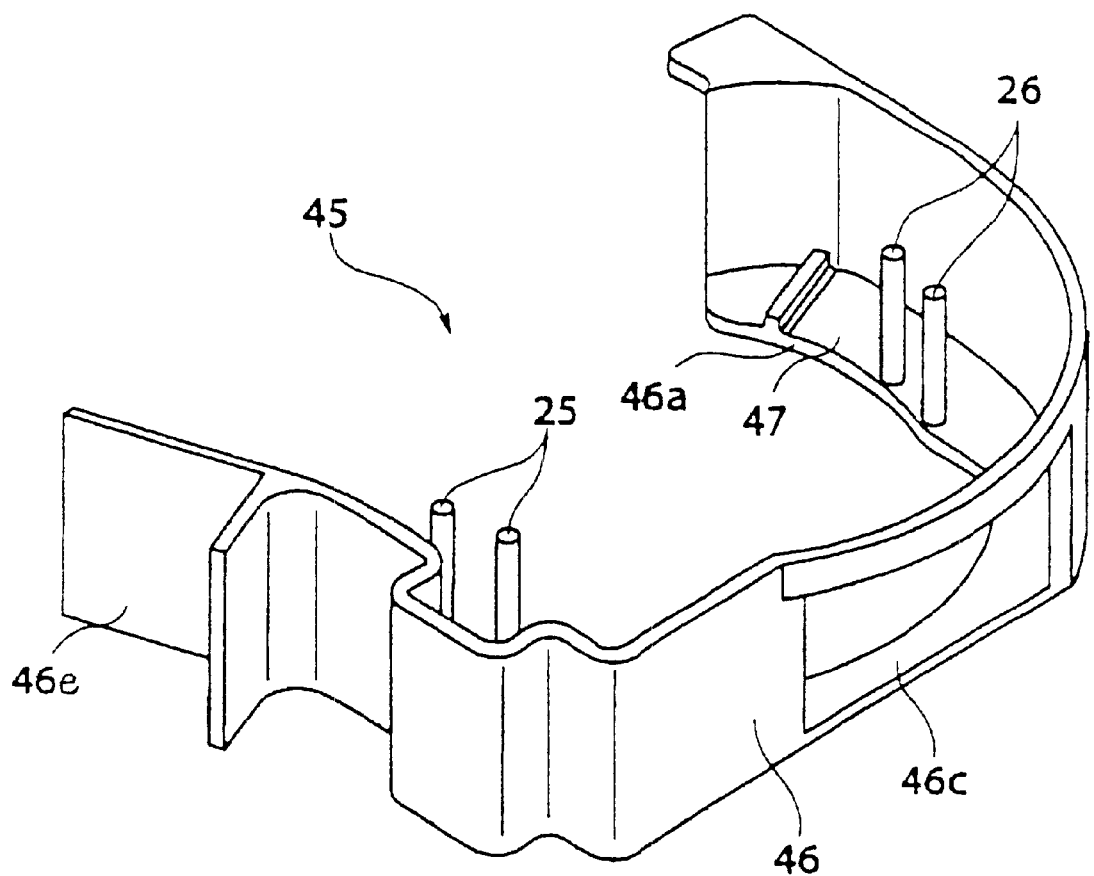
FIG. 13 is a perspective view showing the detail of the gear holder shown in FIG. 12 according to the first embodiment.
Figure 14:
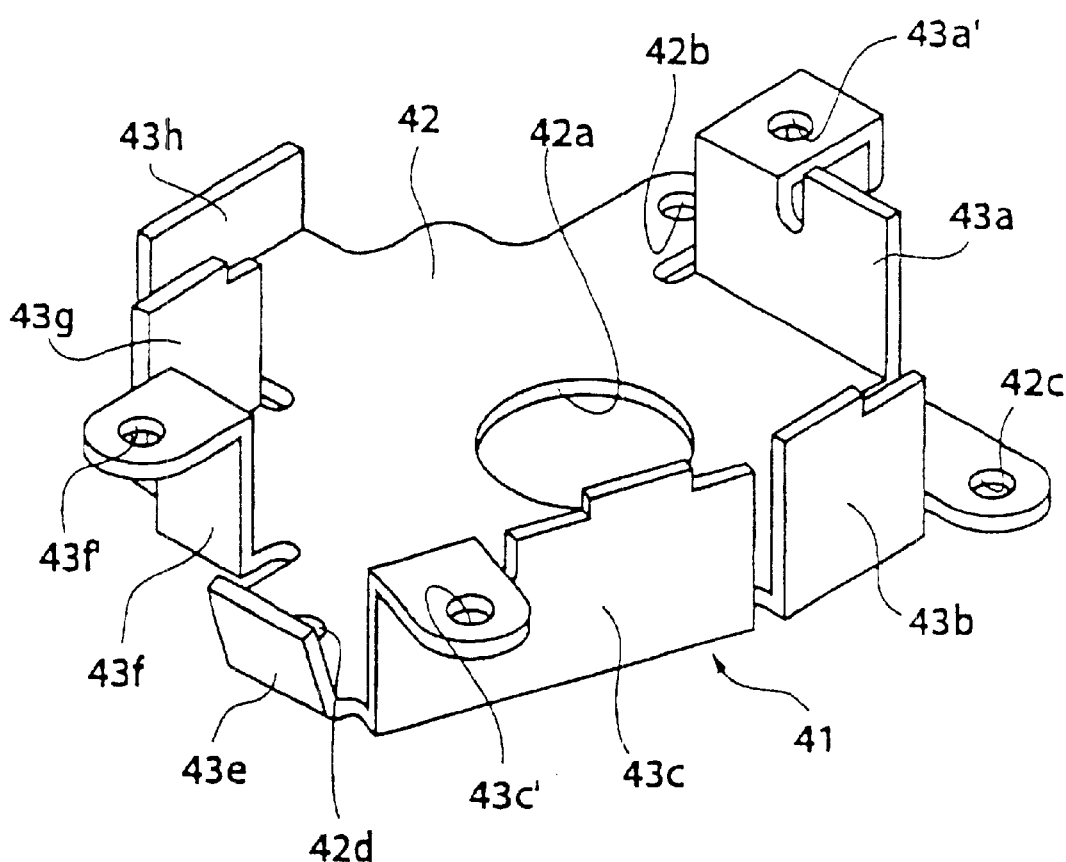
FIG. 14 is a perspective view showing the detail of the base shown in FIG. 12 according to the first embodiment.

FIGS. 5 through 14 are views showing the construction of a seat belt retractor having the pre-tensioner of the first embodiment. FIG. 5 is a perspective exploded view showing the general construction of the seat belt retractor. FIG. 6 is a partially enlarged perspective exploded view showing an emergency locking mechanism and an energy absorbing mechanism (EA mechanism) of the retractor shown in FIG. 5. FIG. 7 is a partially enlarged perspective exploded view showing a frame and parts surrounding the frame of the retractor shown in FIG. 5. FIG. 8 is a partially enlarged perspective exploded view showing the pre-tensioner of the retractor shown in FIG. 5. FIGS. 9(a), 9(b) are partially enlarged perspective views showing the EA mechanism of the retractor shown in FIG. 5. FIG. 10 is a partially enlarged sectional view showing the EA mechanism in the assembled state of the retractor shown in FIG. 5. FIGS. 11 (a) through 11(e) are views for explaining the operation of the EA mechanism. FIG. 12 is a perspective view showing the detail of a pipe, a base, and a gear holder of the pretensioner. FIG. 13 is a perspective view showing the detail of the gear holder. FIG. 14 is a perspective view showing the detail of the base.

As shown in FIG. 5, a seat belt retractor 1 of this embodiment generally comprises the following: (1) a frame 2; (2) a reel 4 for winding up a belt 3; (3) a locking means 5 arranged at a side of the frame 2 which prevents the reel 4 from rotating in the belt withdrawing direction during the emergency locking operation; (4) an emergency locking mechanism 6 which actuates the locking means 5 in the event of a vehicle collision; (5) an EA mechanism 7 which limits the load of the belt 3 when the belt 3 is prevented from being withdrawn by the operation of the locking means 5; (6) a deceleration detecting means 8 for detecting the vehicle deceleration; (7) a return spring 9 for biasing the reel 4 in the belt take-up direction; and (8) a pre-tensioner 10 which rotates the reel 1 in the belt take-up direction immediately in the event of vehicle collision.

Now, the frame 2 will be described with reference to FIG. 7.

The frame 2 comprises a pair of side walls 50, 51 extending parallel to each other and a backing wall 52 connecting the side walls 50, 51. For example, the frame 2 is a pressed product made of steel plates or a die-cast product of aluminum. Disposed between the side walls 50, 51 of the frame 2 is the reel 4 for taking up the belt 3.

The side wall 50 is provided with a large circular hole 50a. The other side wall 51 is also provided with a large circular hole 51a formed concentrically with the large hole 50a. Fixed to the large hole 51a is a gear member 53. The member 53 has a predetermined number of internal teeth 53a formed on the inner periphery like a ratchet. The internal teeth 53a of the gear member 53 and the large hole 51a are concentric with each other. The side wall 51 is also provided with a mounting hole 51b for mounting the deceleration detecting means 8.

Hereinafter, the reel 4 will be described with reference to FIG. 8.

The reel 4 comprises a belt taking-up portion 4a for taking up the belt 3 and flange portions 4b, 4c at both ends of the belt taking-up portion 4a. The reel 4 is provided, at the left side of its left-side (in the drawing) flange 4b, with a hexagonal head portion 4d of which outer circumferential section is hexagon. Additionally, a spring-force applying shaft 4e is formed projecting from the end of the hexagonal head portion 4d. In the assembled state, the hexagonal head portion 4d projects from the side wall 50 of the frame 2 shown in FIG. 5 in the axial direction. The spring-force applying shaft 4e is inserted into a bush shaft 71 of a return spring 9 shown in FIG. 8, applying the spring force of the return spring 9 to the shaft.

The reel 4 is provided, at the right side of the right-side (in the drawing) flange 4c, with a spool ring supporting shaft 4g. The shaft 4g has a predetermined number (six in the illustrated example) of projections 4f formed on the outer circumference thereof. In the assembled state, the shaft 4g projects from the side wall 51 of the frame 2 shown in FIG. 5 and supports a spool ring 64, described later, not to allow the relative rotation.

The reel 4 is provided at its center with a hole 4h extending in the axial direction. The hole 4h extends, though not illustrated, inside the hexagonal head portion 4d, positioned at the left side of the drawing and the portion of the hole 4h positioned inside the hexagonal head portion 4d (i.e. the inner periphery of the hexagonal head portion 4d) has also a hexagonal section. The portion of the hole 4h has a relatively large diameter at a portion to the flange 4b and a relatively small diameter at a portion from the flange 4b to the hexagonal head portion 4d. The end of the hole 4h is closed by a side wall of the hexagonal head portion 4d wherein the spring-force applying shaft 4e projects from the side wall.

Hereinafter, the pre-tensioner 10 will be described.

As shown in FIG. 5, the pre-tensioner 10 mainly comprises a pipe 21 for housing balls as driving members therein. The pipe 21 is mounted to the outer surface of the side wall 50 of the frame 2 in a state assembled to a base 41. As best seen in FIG. 14, the base 41 comprises a base plate 42, which is like a flat plate. The base plate 42 has a through hole 42a formed substantially at the center thereof and three mounting holes 42b, 42c, and 42d formed around the outer periphery thereof. Inserted into the through hole 42a is the spring-force applying shaft 4e (see FIG. 8) of the reel 4. Inserted into the mounting holes 42b, 42c, and 42d are screws 44 (see FIG. 5) for securing the base 41 and the return spring 9 integrally.

The base plate 42 is provided, around the peripheral edge thereof, with a plurality of guide plates 43a–43h integrally formed with the base plate 42. The guide plates 43a–43h extend substantially perpendicular to the base plate 42. As shown in FIG. 8 or FIG. 12, among the guides plate 43a–43h, the guide plates 43a, 43e, 43f, and 43g are positioned inside (i.e., within the curvature of) a pipe 21 of the pre-tensioner 10, while the guide plates 43b, 43c, and 43h are positioned outside the pipe 21. The end portions of the guide plates 43a, 43c, and 43f are folded outwardly and the folded end portions have mounting holes 43a', 43c', and 43f, respectively, formed therein. Inserted into the mounting holes 43a', 43c', and 43f are rivets 49 (see FIG. 5) for fixing the base 41 to the side wall 50 of the frame 2. By these rivets 49, a case 17, described later, is fixed to the mounting holes 43c', 43f.

As shown in FIG. 1 and FIG. 5, a C-like gear holder 45 is fitted inside the pipe 21 of the pre-tensioner 10. The gear holder 45 comprises a side plate 17 and a backing plate 46 which are made of flexible resin material, as shown in FIG. 13. The side plate 47 overhangs inwardly from one side edge of the backing plate 46.

The side plate 47 is provided with two pairs of pins 25, 26 in which the pairs are formed at two locations facing to each other. The pins 25, 26 sandwich some of levers 33 of a ring gear 30 in the state before the actuation of the pre-tensioner (FIG. 1).

The side plate 47 has two projections 28 (see FIG. 12) projecting from portions thereof substantially behind the locations of pins 25, 26. The projections 28 engage with holes (not shown) formed outside of the side wall 50 of the frame 2. The engagement between the projections 28 and the holes aligns the pre-tensioner 10 with the frame 2.

An inner periphery 46a of the side plate 47 buts the outer periphery 30b of the ring gear 30 in the state before the actuation of the pre-tensioner as shown in FIG. 1. Another inner periphery 46b confronting the inner periphery 46a also abuts the outer periphery 30b of the ring gear 30.

The backing plate 46 is provided with a hinge portion 46c at the middle of the C-like shape thereof. The hinge portion 46c is provided with an opening formed therein for preventing the interference with the lever ends of the ring gear 30. The gear holder 45 bends at the hinge portion 46c just after the actuation of the pre-tensioner (in the state of FIG. 2). As a result, the holding of ring gear 30 is canceled.

As shown in FIG. 12 and FIG. 1, fixed to the base 41 is the pipe (passage) 21 which is curved to surround the through hole 42a of the base 41. The pipe 21 is formed by bending a steel tube (one example). Hence, the passage may be a cylinder or a cylindrical pipe. Pipe 21 has a circular internal cross-section. The pipe 21 is bent to surround the through hole 42a of the base 41. The pipe 21 has a lower or start end portion 21c, a straight portion 21g upwardly extending from the start end portion 21c with substantially 90° curve, and an upper semicircular portion 21h extending from the straight portion 21g. The end of the semicircular portion 21h is continued to a straight portion 21i downwardly extending which is further continued to a straight portion 21j extending slightly inwardly. An end opening 21b is formed at the end of the straight portion 21j.

The pipe 21 has a cut-out 21a formed in inner circumferential surface of the straight portions 21i, 21j near the end opening 21b in such a manner that a part of the ring gear 30 can enter into the cut-out 21a. Some of the levers 32, 33 of the ring gear 30 are positioned in the cut-out 21a. Since the pipe 21 is bent, the size of the pre-tensioner 10 can be compact as a whole and the degree of freedom for design is improved as compared to the conventional one having a straight pipe. It should be noted that the pipe 21 may be bent in various shapes such as in a three-dimensional configuration.

Connected to the start end portion 21c of the pipe 21 is a pipe-shaped pressure vessel 21d of which diameter is slightly larger than that of the pipe 21. A gas generator 15 is accommodated in the pressure vessel 21d. The gas generator 15 ignites powder according to a signal outputted from a collision detection means (not shown) at a vehicle collision so as to supply gas pressure into the pipe 21. After the gas generator 15 is inserted into the pressure vessel 21d, the gas generator 15 is fixed by inwardly caulking a flange 21f.

The description of the pre-tensioner 10 will be continuously made hereinafter.

The hexagonal head portion 4d of the reel 4 shown in FIG. 8 passes through the left side wall 50 of the frame 2 shown in FIG. 5. Fitted to the outer periphery of the hexagonal head portion 4d is a pinion 23 (a second rotational member). The pinion 23 is provided with external teeth 24 formed around the outer periphery thereof.

As shown in FIG. 1, the ring gear 30 (a first rotational member) is arranged to surround the pinion 23. Formed around the inner periphery of the ring gear 30 are internal teeth 31 engageable with the external teeth 24 of the pinion 23. It should be noted that the external teeth 24 of the pinion 23 and the internal teeth 31 of the ring gear 30 are not engaged in a state before the operation of the pre-tensioner (FIG. 1).

The ring gear 30 has levers (driving points) 32, 33 projecting outwardly, which are formed on the outer periphery of the ring gear 30 at predetermined intervals. One (numeral 32) of these levers has a flat top which is particularly larger than those of the other levers 33. Formed between the adjacent levers 32, 33 and 33, 33 are trapezoidal valleys. The valleys are engaged with balls which will be described later.

The pairs of pins 25, 26 standing on the gear holder 45 sandwich two levers 33 opposite to each other about the axis of the ring gear 30 whereby the ring gear 30 is held at a fixed position in the gear holder 45. Since the inner diameter of the ring gear 30 is larger than the outer diameter of the pinion 23, in the state of FIG. 1, a clearance exists between the internal teeth 31 of the ring gear 30 and the external teeth 24 of the pinion 23 so that these are not engaged. Therefore, the reel 4 can freely rotate in spite of the existence of the pre-tensioner 10. This is the state where the clutch mechanism composed of the pinion 23 and the ring gear 30 is inoperative.

As shown in FIG. 1, plural (15 in the drawings) balls 20 are housed in the pipe 21 of the pre-tensioner 10. The balls 20-2 through 20-15 except the ball 20-1 nearest to the gas generator 15 are metallic spheres of, for example, steel. The outside diameter of the balls 20-2 through the 20-15 is slightly smaller than the bore diameter of the pipe 21 in such a manner that the balls are loosely fitted in the pipe 21 (for example, a clearance there between is 0.4 mm while the outside diameter of the balls is 10.6 mm). The head ball 20-15 is substantially in contact with the lever 32 of the ring gear 30. Preferable material and characteristics of the balls (driving members) will be described later.

On the other hand, the ball 20-1 nearest to the gas generator 15 is made of resin such as silicone rubber. The ball 20-1 functions as a piston after the ignition of the gas generator 15. The ball 20-1 also functions as a sealing member which prevents gas from leaking toward the head because the ball 20-1 deforms to expand so as to come into close contact with the inner surface of the pipe 21.

Hereinafter, the deformation of the ball 20-1 will be described with reference to FIGS. 15(a) through 15(c).

Figure 15:
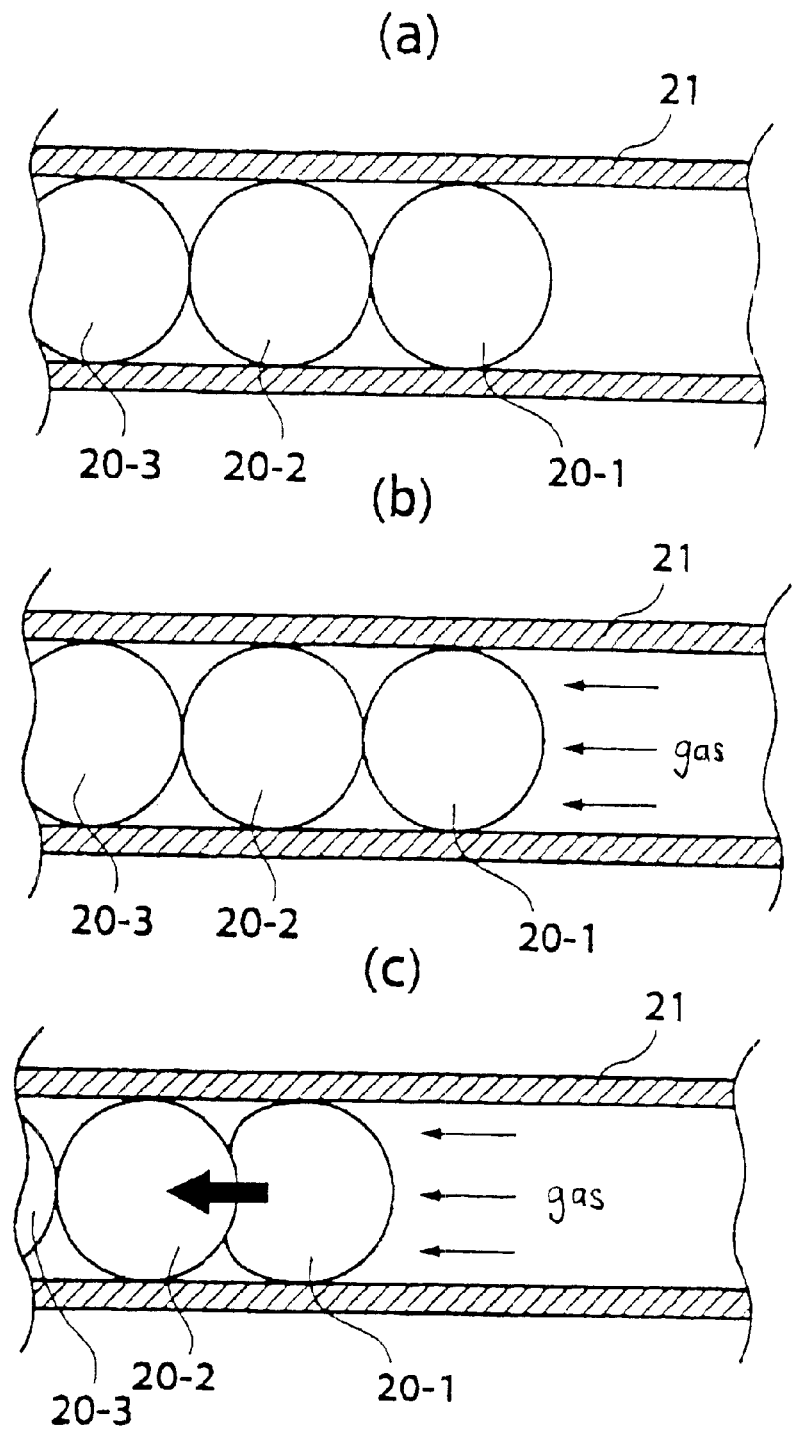
FIGS. 15(a)–15(c) are views for explaining the states of deforming the resin balls according to the first embodiment.
Figure 16:
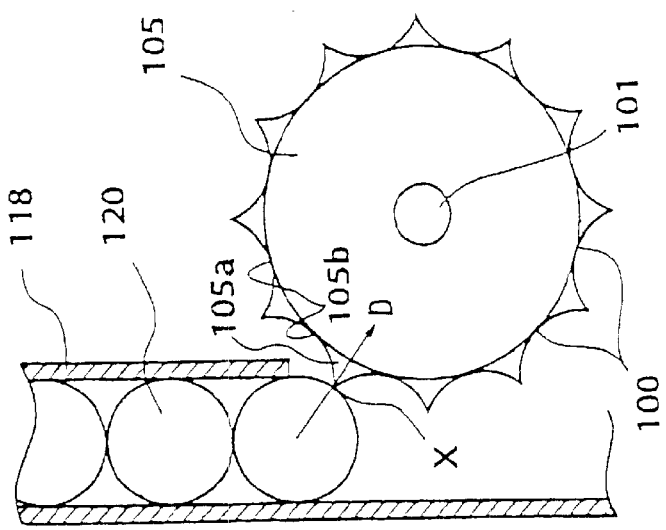
FIGS. 16(a)–16(c) are views for explaining the operation of a conventional pretensioner.
Figure 16:
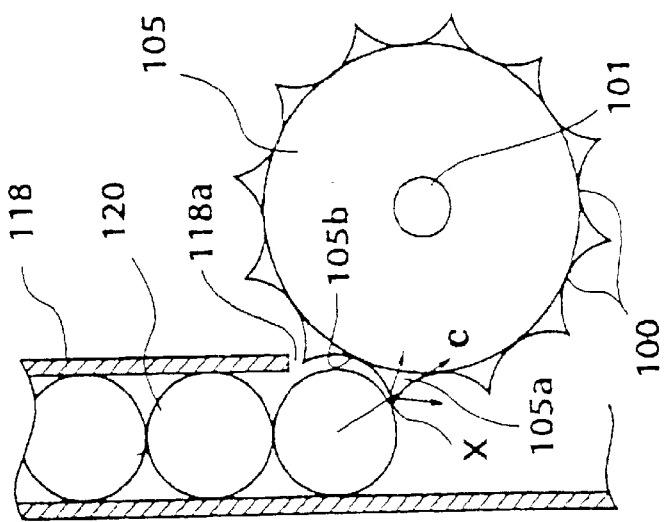
Figure 16:
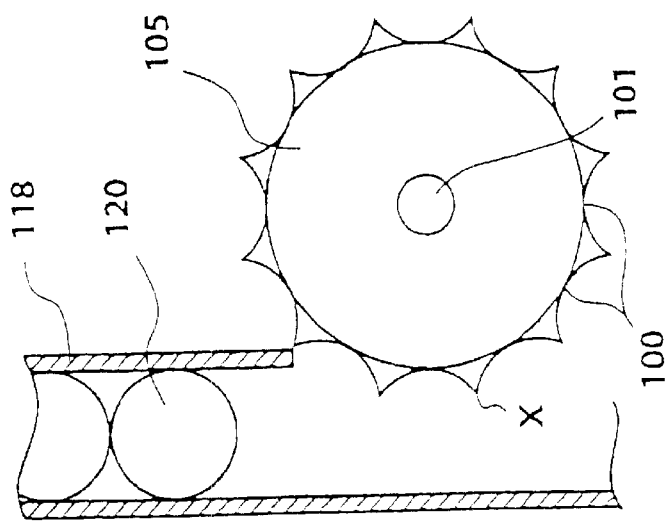
Figure 17:
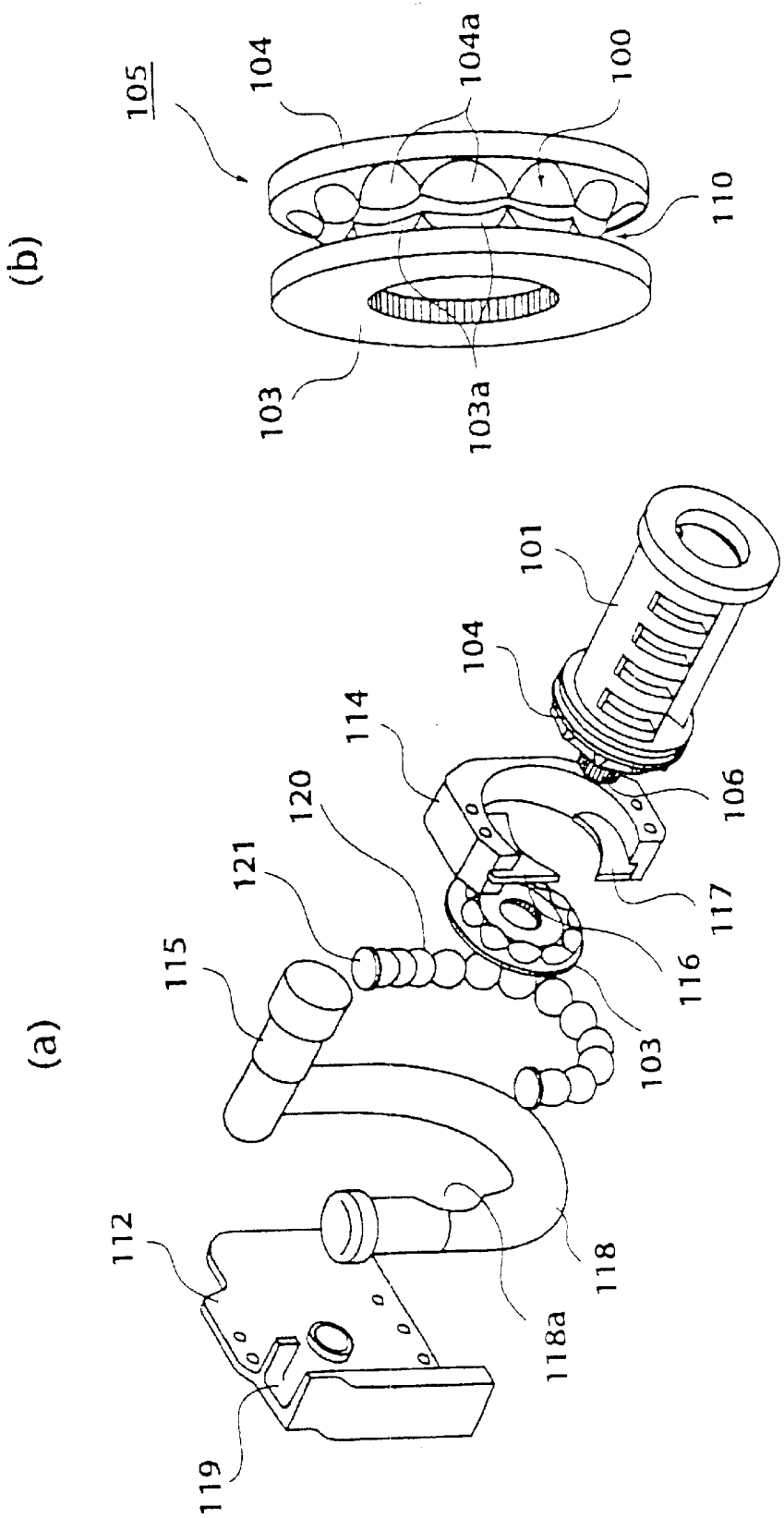
FIG. 17(a) is an exploded perspective view of a conventional pre-tensioner and FIG. 17(b) is a detailed view of the drive wheel.

As shown in FIG. 15(a), the ball 20-1 keeps its shape substantially spherical before the gas generator 15 ignites. As the gas generator 15 ignites in this state, gas pressure is exerted on the ball 20-1 in the direction of the arrow in FIG. 15(b). As the gas pressure is exerted, the ball 20-1 is deformed in the direction that the gas pressure is exerted (the arrow direction) by the gas pressure and the reaction force pressing the ball 20-2 as shown in FIG. 15(c). This deformation expands the outside diameter of the ball 20-1 in a direction perpendicular to the direction that the gas pressure is exerted (the arrow direction). The area of the ball 20-1 that is in contact with the inner surface of the pipe 21 is increased so that the ball 20-1 functions as a sealing member.

As the balls 20 press the lever 32 and 33 after the ignition of the gas generator 15, the positioning pins 25, 26 are broken so that the ring gear 30 moves in the rightward direction in the drawing in FIG. 2 and rotates (the detail will be described later with reference to FIGS. 2–4).

At the end of the end opening 21b of the pipe 21, a case 17 is disposed in order to receive the balls 20 pushed out from the pipe 21. Between the terminal end of the pipe 21 and the case 17, a guide plate 13c exists. The balls 20 pushed out from the pipe 21 are collected by the case 17.

Hereinafter, the locking means 5 will be described with reference to mainly FIG. 6 and FIGS. 9(a), 9(b).

The locking means 5 comprises a locking base 54 and a pawl 55. As best seen in FIG. 9(a), the locking base 54 comprises a circular disk portion 54a. The disk portion 54a has an eccentric cam 54b having circular outer periphery which is eccentric from the center of the disk portion 54a. On the same surface of the disk portion 54a where the eccentric cam 54b is formed, an axial hexagonal hole 54c having a hexagonal cross-section is provided as shown in FIG. 9(a). The hole 54c may be circular with serrations as shown in FIG. 9(b).

As best seen in FIG. 6, the disk portion 54a is provided with a through hole 54d formed therein for rotatably supporting the pawl 55 and a load-transmitted portion 54e formed in an arc-like shape of the same axis of the through hole 54d. The load-transmitted portion 54e is designed to receive the load from the pawl 55.

The disk portion 54a is also provided with a spring support 54f for supporting an end of a pawl spring 56 as shown in FIG. 6. The disk portion 54a further has a stepped shaft standing at the center of a surface opposite to the surface where the axial hexagonal hole 54c (see FIG. 9) is formed wherein the stepped shaft is composed of a large-diameter shaft 54g and a small-diameter shaft 54h.

The pawl 55 has a hole 55a formed at the pivot end. By fitting a pin 57 into the hole 55a and the through hole 54d of the locking base 54, the pawl 55 is mounted to the locking base 51 so that the pawl 55 can pivot about the hole 55a. The pawl 55 is provided at its end with a pawl end 55b engageable with one of the internal teeth 53a of the gear member 53 in the frame side wall 51 shown in FIG. 7 and provided with a projecting pin as a cam follower 55c. The pawl 55 has a load-transmitting portion 55d of an arc-like shape. When the pawl end 55b engages with one of the internal teeth 53a, the load-transmitting portion 55d transmits the reaction force acting on the pawl 55 to the load-transmitted portion 54e of the locking base 54. That is, the reaction force of the pawl 55 is supported by the locking base 54.

As best seen in FIG. 6, the emergency locking mechanism 6 comprises a lock gear 58, a flywheel 59, and a flywheel spring 60 to be compressed between the lock gear 58 and the flywheel 59. The emergency locking mechanism 6 comprises a retainer housing 61 detachably fixed to the side wall 51 (see FIG. 5) of the frame 2, and a pawl spring 56 to be compressed between the locking base 54 and the lock gear 58.

The lock gear 58 comprises a disk portion 58a and a ring-like flange 58c formed around the outer periphery of the disk portion 58a. Formed on the outer periphery of the ring-like flange 58c are a predetermined number of outer teeth 58b like a ratchet.

The disk portion 58a of the lock gear 58 has a cylindrical boss 58d formed at the center thereof and a supporting pin 58e standing on a portion near the boss 58d for rotatable supporting the flywheel 59. The disk portion 58a is provided with first and second stoppers 58f, 58g for restricting the rotation of the flywheel 59 within a predetermined range.

The disk portion 58a is also provided with a cam slot 58h formed therein, in which the cam follower 55c of the pawl 55 is fitted. Therefore, when the lock gear 58 rotates relative to the locking base 51, the cam follower 55c is guided by the cam slot 58h so that the pawl 55 pivots about the hole 55a.

The disk portion 58a is further provided with a spring support 58i for supporting one end of the pawl spring 56.

The large-diameter shaft 54g of the locking base 54 is fitted in the cylindrical boss 58b of the lock gear 58 whereby the lock gear 58 can be supported rotatably relative to the large-diameter shaft 54g.

The flywheel 59 is provided with a supporting hole 59a, in which the supporting pin 58e of the lock gear 58 is fitted rotatably, and an engaging portion 59c having engaging tip 59b. When the flywheel 59 is rotatably supported by the supporting hole 59a, the engaging portion 59c is positioned between the first and second stoppers 58f, 58g. Therefore, the rotation of the flywheel 59 is restricted between the first and second stoppers 58f, 58g. When the engaging portion 59c is in contact with the first stopper 58f, the engaging tip 59b is retracted inwardly. On the other hand, when the engaging portion 59c is in contact with the second stopper 58g, the engaging tip 59b projects outwardly. Further, the flywheel 39 is also provided with a spring supporting member 59d for supporting one end of the flywheel spring 60.

One end of the pawl spring 36 is supported by the spring supporting portion 58i of the lock gear 58. The other end of the pawl spring 56 is supported by the spring supporting portion 54f of the locking base 51 so that the pawl spring 56 always biases the lock gear 58 relative to the locking base 51 in the belt withdrawing direction α. Therefore, when the lock gear 58 is inoperative, the cam follower 55c of the pawl 55 is positioned at the inner-most position of the cam slot 58h. In this state, the lock gear 58 is prevented from rotating by the pawl spring 56.

One end of the flywheel spring 60 is supported by the spring supporting portion 59d of the flywheel 59. The other end of the flywheel spring 60 is supported by the spring supporting portion (not shown) of the lock gear 58 so that the flywheel spring 60 always biases the flywheel 59 relative to the lock gear 58 in the belt withdrawing direction α. Therefore, when the flywheel 59 is inoperative, the engaging portion 59c is in contact with the first stopper 58f and is retracted inwardly.

As shown in FIG. 10 by two-dot chain line, the retainer housing 61 comprises a disk portion 61b having a hole 61a formed in the center thereof (concentrically with the rotational axis of the reel 4) and a ring-like flange 61c formed around the outer periphery of the disk portion 61b to project toward the frame 2. Formed on a surface, facing the frame 2, of the disk portion 61b of the retainer housing 61 is a ring-like flange 61e. The flange 61e has internal teeth 61d, like a ratchet, formed on the inner periphery concentric with the hole 61a. The ring-like flange 61e is set to have such a size that the flange 61e enters into a space between the ring-like flange 58c of the lock gear 58 and the first and second stoppers 58f, 58g when the retractor 1 is assembled. The engaging tip 59b of the flywheel 59 is positioned inside the ring-like flange 61e and the flywheel 59 rotates relative to the lock gear 58. At a position where the engaging portion 59c is in contact with the second stopper 58g, the engaging portion 59c engages with one of the internal teeth 61d.

As shown in FIG. 10, the small-diameter shaft 54h of the locking base 34 is rotatably supported by and fitted in the hole 61a of the retainer housing 61.

As shown in FIG. 5 through FIG. 7, the EA mechanism 7 comprises a torsion bar 62 and a ring-like stopper ring 63 controlled by the eccentric cam 54b of the locking base 54. The EA mechanism 7 further comprises a spool ring 64 (see FIG. 7) supported by the spool ring supporting shaft 4g (see FIG. 8) of the reel 4 not allowing the relative rotation.

As best seen in FIG. 6, the torsion bar 62 comprises a torsion bar portion 62a and a first torque transmitting portion 62b having a hexagonal section which is provided on one end of the torsion bar portion 62a on a side of the locking base 54. The first torque transmitting portion 62b is fitted in the axial hexagonal hole 54c (see FIG. 9) of the locking base 54 not allowing the relative rotation with the locking base 54. The torsion bar 62 has the second torque transmitting portion 62c having a hexagonal section which is provided on the other end of the torsion bar portion 62a. The second torque transmitting portion 62c is fitted with the inner periphery of the hexagonal head portion 4d (see FIG. 8) of the reel 4 not allowing the relative rotation with the reel 4.

As best seen in FIG. 9, the ring-like stopper ring 63 has a hole 63a to be fitted to the outer periphery 54i of the eccentric cam 54b of the locking base 54. As shown in FIGS. 11(a), 11(e), in the state where the stopper ring 63 is fitted to the eccentric cam 54b, a friction is produced between the outer periphery 54i of the eccentric cam 54b and the inner periphery 63b of the hole 63a. The stopper ring 63 does not rotate relative to the locking base 54 when a predetermined external force is not applied in the circumferential direction. On the other hand, the stopper ring 63 rotates relative to the locking base 54 when a predetermined external force is applied in the circumferential direction.

Formed on the outer periphery 63c of the stopper ring 63 are first and second stopper engaging projections 63d, 63e formed at predetermined distances in the circumferential direction and also a stopper catching projection 63f. The first and second stopper engaging projections 63d, 63e form substantially triangles, respectively. In this case, as shown in FIG. 11(a), surfaces 63h, 63i facing to the belt withdrawing direction α extend substantially perpendicular to an outer periphery 63c and surfaces 63k etc. facing to the belt take-up direction β form an arc with gentle slope. The first and second stopper engaging projections 63d, 63e both have the same height from the outer periphery 63 of the stopper ring 63.

An end face 63j, facing to the belt withdrawing direction α, of the stopper catching projection 63f extends substantially perpendicular to the outer periphery 63c. The stopper catching projection 63f has a predetermined length (width) in the circumferential direction. The outer periphery 63g of the stopper catching projection 63f forms an arc having the same diameter of the inner periphery 64f of the spool ring 61 (see FIG. 7) and is thus eccentric from the center of the inner and outer peripheries 63b, 63c of the stopper ring 63. The outer periphery 63g is arranged so as to be in contact with the inner periphery 64f of the spool ring 64.

As best seen in FIG. 7, the spool ring 64 comprises a disk portion 64a and a ring-like flange 64b formed on the outer peripheral edge of the disk portion 64a. The disk portion 64a has a large hole 64c at the center thereof. Formed on the inner periphery of the hole 64c are concavities 64d to be fitted to the projections 4f of the spool ring supporting shaft 4g shown in FIG. 8, the number of the concavities 64d being equal to the number of the projections 4f. The hole 64c of the spool ring 64 is fitted to the spool ring supporting shaft 4g and the concavities 64d are fitted to the projections 4f so that the spool ring 64 is supported to the reel 4 not allowing the relative rotation with the reel 4.

As shown in FIGS. 11(a)–11(e), the ring-like flange 64b of the spool ring 64 is partly dented so as to form a reel-side stopping projection 64e. The stopping projection 64e forms a triangle. In this case, a surface, facing to the belt withdrawing direction α (extending in the circumferential direction), of the stopping projection 64e is a relatively gentle slope. This surface has such a configuration that it does not interfere with the first stopper engaging projection 63d of the stopper ring 63. The surface facing to the belt take-up direction β (the surface extending radially) extends substantially perpendicular to the inner periphery 64f of the ring-like flange 64b.

As best seen in FIG. 7, the deceleration detecting means 8 comprises a housing 65 attached to the frame side wall 51, a sensor casing 66 attached to the housing 65, an inertial mass 67 provided in the sensor casing 66, and an actuator 68 to be actuated by the inertial mass 67.

The housing 65 comprises a fitting portion 65a to be attached to the mounting hole 51b formed in the side wall 51 of the frame 2, and a pair of supporting arms 65b, 65c supporting the sensor casing 66. The sensor casing 66 comprises a pair of supported portions 66a, 66b fitted to and supported by grooves of the supporting arms 65b, 65c, a mass receiving portion 66c for receiving the inertial mass 67, and a pair of supporting arms 66d, 66e rotatably supporting the actuator 68.

The inertial mass 67 comprises a leg 67a, a mass portion 67b above the leg 67a, and an operating portion 67c for actuating the actuator 68. The inertial mass 67 is arranged in the mass receiving portion 66c. Normally, the inertial mass 67 stands as illustrated. When the vehicle is decelerated at a predetermined deceleration or more, the inertial mass 67 tilts so that the operational portion 67c pivots the actuator 68.

The actuator 68 comprises a pivot shaft 68a rotatably fitted and supported between a pair of the supporting arms 66d, 66e of the sensor casing 66, a pressed portion 68b to be pressed by the operating portion 67c of the inertial mass 67, and an engaging tip 68c which is formed on the opposite side of the pivot shaft 68a and is engageable with one of the external teeth 58b of the lock gear 58. The actuator 68 is positioned at the lower-most position when the inertial mass 67 stands straight. In this state, the actuator 68 is in the non-engaged position where the engaging tip 68c is not engaged with the external teeth 58b of the lock gear 58. When the inertial mass 67 tilts, the actuator 68 is pivoted upwardly and comes into the engaged position where the engaging tip 68c is engaged with one of the external teeth 58b of the lock gear 58.

As shown in FIG. 8, the bush 69 is a spacer fitted to the shaft 4k of the reel 4. As shown in FIG. 8, the return spring 9 comprises a spring casing 70, a bush shaft 71, and a spiral spring 72. The bush shaft 71 is fitted to the spring-force applying shaft 4e of the reel 4 through spline grooves of the spring-force applying shaft 4e not allowing the relative rotation. The spiral spring 72 is connected at its outer end to the spring casing 70 and at its inner end to the bush shaft 71 so as to always bias the reel 4 in the belt take-up direction β.

Hereinafter, the operation of the pre-tensioner 10 in the seat belt retractor 1 as structured above will be described with reference to FIGS. 1 through 4.

When the pre-tensioner is inoperative (the normal state of the retractor), the ring gear 30 is held in the fixed position in the casing by the pins 25, 25, 26, 26 and the contact surfaces 46a, 46b of the gear holder 45 so that the ring gear 30 and the pinion 23 are not engaged with each other, as shown in FIG. 1. Therefore, the take-up shaft (reel 4) freely rotates independently of the pre-tensioner 10.

As a vehicle collision is detected, a signal is transmitted to the gas generator 15. By the signal, as shown in FIG. 2, the gas generator 15 ignites to supply gas pressure into the pipe 21. The ball 20-1 nearest to the gas generator 15 functions as a piston and is pressed by the gas pressure. By the pressing force, the balls 20 move in regular order and this force is transmitted to the head ball 20-15 (the ball in contact with the lever 32 of the ring gear 30).

At this point, the ball 20-1 deforms to expand by the gas pressure as mentioned above. Therefore, the sealing is achieved between the inner surface of the pipe 21 and the ball 20-1, thereby preventing the gas from leaking toward the head.

Because of the pressing force on the balls 20, the ring gear 30 is subjected to pressing force or torque so that the pins 25, 25, 26, 26 (see FIG. 1) are sheared. Then, the ring gear 30 is pressed in the direction of arrow X of FIG. 2 so that the internal teeth 31 of the ring gear 30 engage with the external teeth 24 of the pinion 23. In addition, the gear holder 45 is pressed upwardly by the rotation of the ring gear 30 and is thus bent at the hinge portion 46c so that the ring gear 30 freely rotates. Since the gear holder 45 is made of resin, the gear holder 45 is easily bent at the hinge portion 46c.

The ring gear 30 moves toward the axis of the pinion 23 and rotates about the axis of the pinion 23 by the force of the balls 20 pushing the lever 32. Since the head ball 20-15 is substantially in contact with the lever 32 of the ring gear 30 for imparting the torque before the ring gear 30 starts to move, the lever 32 is securely pressed and starts to rotate without locking.

As the balls 20 are further subjected to the gas pressure and are thus pressed to advance in regular order, the balls 20 engage the respective valleys between the levers 33 of the ring gear 30. Since there is clearance between the balls 20-2 through 20-15 and the pipe 21, the balls 20 smoothly advance. As the balls 20 are engaged in regular order with the ring gear 30, the ring gear 30 rotates in the direction of arrow Y as shown in FIGS. 2–4. The engagement between the external teeth 24 of the pinion 23 and the internal teeth 31 of the ring gear 30 transmits the rotation of the ring gear 30 to the pinion 23 so that the pinion 23 and the ring gear 30 interlock to rotate with each other. At this point, since the number of the external teeth 21 of the pinion 23 is smaller than the number of the internal teeth 31 of the ring gear 30, the transmission of the rotation from ring gear 30 to the pinion 23 results in a speed-up function so that the pinion 23 rotates faster than the ring gear 30.

Since the pinion 23 is fixed to the hexagonal head portion 4d of the reel 4, the reel 4 together with the pinion 23 rotates so that the belt 3 (FIG. 5) is rapidly wound up for a predetermined length in the belt take-up direction. Because of the increment of the rotation speed described above, the rotational angle of the reel 4 becomes larger than the rotational angle of the ring gear 30 so that the length of the belt to be wound by the pre-tensioner becomes long.

The pressed balls 20 pushed out from the end opening 21b of the pipe 21 are collected in the case 17 as shown in FIG. 1. This facilitates the handling after the actuation of the pre-tensioner 10. Though the end opening 21b of the pipe 21 is closed by a fin 46e of the gear holder 45, the fin 46e is pressed by the balls 20 and is thus opened after the actuation of the pre-tensioner.

Hereinafter, the general action of the seat belt retractor of this embodiment structured as described above will be described.

When the occupant does not wear the seat belt, most of the seat belt 3 is wound around the reel 4 by action of the spring force of the return spring 9 and is accommodated in the frame 2. The flywheel 59 of the emergency locking mechanism 6 is biased by the spring force of the flywheel spring 60 so that the engaging portion 59c shown in FIG. 6 is in contact with the first stopper 58f. At this point, the engaging tip 59b of the flywheel 59 does not engage with any of the internal teeth 61d of the retainer housing 61. Therefore, the flywheel 59 and the retainer housing 61 are set in the non-engaged position.

The inertial mass 67 (FIG. 7) of the deceleration detecting means 8 stands straight. As for the actuator 68, the engaging tip 68c does not engage with any of the external teeth 58b of the lock gear 58 of the emergency locking mechanism 6. Therefore, the actuator 68 and the lock gear 58 are set in the non-engaged position.

The lock gear 58 is subjected to the spring force of the pawl spring 56 (FIG. 5). Accordingly, the pawl 55 is restricted by the lock gear 58 and is thus at the non-engaged position where the pawl 55 of the locking means 5 does not engage with any of the internal teeth 53a of the gear member 53 (FIG. 7). Therefore, in this state, the reel 4 can be freely rotated in the belt withdrawing direction α (FIG. 8).

The first stopper engaging projection 63d (FIG. 5) of the stopper ring 63 is set at such a position that it can engage with the reel-side stopping projection 64e of the spool ring 64 at the maximum eccentric position by the eccentric cam 54b.

When the vehicle occupant is about to wear the seat belt 3, he or she pulls the seat belt 3 at a normal speed. Since the reel 4 is free to rotate in the belt withdrawing direction α, the seat belt 3 is freely withdrawn. During the withdrawal of the seat belt 3, the pawl 55, the flywheel 59, and the actuator 68 are held in the non-engaged positions. During the withdrawal, with the rotation of the reel 4, the spool ring 64 and the locking base 54 integrally rotate. On the other hand, the stopper ring 63 also rotates integrally with the spool ring 64 and the locking base 54. Therefore, the relative position between the stopper ring 63 and the spool ring 64 is held in the initial state.

As the vehicle occupant takes his or her hand off a tongue (not shown) after latching the tongue provided to the seat belt 3 with the buckle fixed to a vehicle body, the reel 4 winds up a loose portion of the seat belt 3 according to the biasing force of the return spring 9. Accordingly, the seat belt 3 fits to the occupant's body. In this way, the occupant wears the seat belt 3.

Even when the seat belt 3 is worn, since the pawl 55, the flywheel 59, and the actuator 67 are all in the non-engaged positions, the reel 4 freely rotates in the belt withdrawing direction α. Therefore, the seat belt 3 is freely withdrawn when the occupant wearing the seat belt 3 is about to move forward for a predetermined distance. The occupant can freely move for the predetermined distance. When the occupant wears the seat belt 3, the relative position between the stopper ring 63 and the spool ring 64 is in held in the initial state.

As the vehicle comes in collision with an object, the pre-tensioner is actuated by a detected signal outputted from a collision detection sensor (not shown). Thus, the reel 4 rotates for a predetermined amount in the belt take-up direction β to wind up the seat belt 3 for a predetermined length. Accordingly, the looseness of the winding of the belt 3 wound onto the reel 4 is cancelled so that the seat belt is tightened.

At this point, the torsion bar 62 also rotates according to the rotation of the reel 4 so that the first torque transmitting portion 62b of the bar 62 rotates together in the same direction β. Therefore, the locking base 54 and the lock gear 58 also rotate integrally with the reel 4 for a predetermined amount in the same direction β.

On the other hand, a very large deceleration is developed on the vehicle due to the vehicle collision. The inertial mass 67 of the deceleration sensing means 8 tilts toward the front of the vehicle. Then, the actuator 68 pivots upwardly to the engaged position where the engaging tip 68c of the actuator 68 engages with one of the external teeth 58b of the lock gear 58. Since, in this state, the occupant tends to move forward because of inertia, the seat belt 3 is intended to be withdrawn so that the reel 4 rotates in the belt withdrawing direction α. The rotation of the reel 4 rotates the locking base 54 and the lock gear 58 integrally with the reel 4 in the same direction α. Accordingly, one of the external teeth 58b of the lock gear 58 engages with the engaging tip 68c, thereby preventing the rotation of the lock gear 58. Even when the rotation of the lock gear 58 is prevented, the reel 4, the locking base 54, and the spool ring 64 rotate continuously in the same direction α, thereby producing the relative rotation between the locking base 54 and the lock gear 58.

Because of the relative rotation between the locking ring 54 and the lock gear 58, the cam follower 55c of the pawl 55 is guided by the cam slot 58h of the lock gear 58 to move within the cam slot 58h. By this movement, the pawl 55 pivots to the engaged position where the engaging end 55b engages with one of the internal teeth 53a of the gear member 53 fixed to the side wall 51 of the frame 2. As the seat belt 3 is withdrawn continuously, the reel 4 further rotates in the same direction α to engage the engaging end 55b with one of the internal teeth 53a. As a result of this, the rotation of the locking base 54 is prevented so that only the reel 4 and the spool ring 64 tend to rotate continuously in the same direction α. Then, the reel 4 and the locking base 54 rotate relative to each other (that is, the first and second torque transmitting portions 62b, 62c of the torsion bar 62 rotate relative to each other) so that the torsion bar portion 62a is twisted. Since the reel 4 rotates in the belt withdrawing direction α twisting the torsion bar 62, the torsion deformation of the torsion bar 62 absorbs the impact applied to the occupant by the seat belt 3.

On the other hand, since the spool ring 64 rotates in the same direction α relative to the locking base 54, as shown in FIG. 11(a), the reel-side stopping projection 64e engages with the first stopper engaging projection 63d soon. As the spool ring 64 rotates continuously, the reel-side stopping projection 64e and the first stopper engaging projection 63d engage with each other so that the stopper ring 63 also rotates integrally with the spool ring 64 in the same direction α. The integral rotation moves the first stopper engaging projection 63d of the stopper ring 63 gradually in such a direction of canceling the engagement between reel-side stopping projection 64e and first stopper engaging portion 63d.

As shown in FIG. 11(b), after the first stopper engaging projection 63d and the reel-side stopping projection 64e comes into the disengaging position, the reel 4 further rotates in the same direction α. Therefore, the engagement between the first stopper engaging projection 63d and the reel-side stopping projection 64e is cancelled. Therefore, only the spool ring 64 rotates integrally with the reel 4 and the stopper ring 63 does not rotate. At a point of time when the engagement between the first stopper engaging projection 63d and the reel-side engaging projection 64e is cancelled, the second stopper engaging projection 63e of the stopper ring 63 is in such a position as to be engageable with the reel-side engaging projection 64e.

In this state, as the seat belt 3 is further withdrawn due to the inertia of the occupant, the reel 4 further rotates in the same direction α so that the spool ring 64 also rotates. Then, the reel-side engaging projection 64e of the spool ring 64 engages with the second stopper engaging projection 63e of the stopper ring 63 so that the stopper ring 63 also rotates integrally with the spool ring 64 again. As the reel 4 rotates for substantially one full turn after the engaging end 55b of the pawl 55 engages with one of the internal teeth 53a, as shown in FIG. 11(c), the second stopper engaging projection 63e becomes maximally eccentric by the eccentric cam 54b whereby the second stopper engaging projection 63e and the reel-side stopping projection 64e engage with each other with the maximum interfacing area. That is, the second stopper engaging projection 63e and the reel-side stopping projection 64e comes into the same state as the engagement between the first stopper engaging projection 63d and the reel-side stopping projection 64e.

After that, in the same manner as the case of the first stopper engaging projection 63d, as the reel 4 and the spool ring 64 rotate in the same direction α, the engagement between the second stopper engaging projection 63e and the reel-side stopping projection 64e is gradually decreased so as to reach the disengaging position shown in FIG. 11(d) similar to FIG. 11(b). Then, the engagement between the second stopper engaging projection 63e and the reel-side stopping projection 64e is cancelled. Therefore, only the reel 4 and the spool ring 64 rotate in the same direction α, stopping the rotation of the stopper ring 63.

In this state, the stopper catching projection 63f is in a position engageable with the reel-side stopping projection 64e, but still not reaching the maximum eccentric position by the eccentric cam 54b. As the reel 4 and the spool ring 64 further rotate in the belt withdrawing direction α, the reel-side stopping projection 64e engages with the stopper catching projection 63f so that the stopper ring 63 rotates integrally with the spool ring 64 again.

As the stopper ring 63 rotates in the same direction α, the eccentricity of the stopper catching projection 63f is gradually increased by the eccentric cam 54b. In addition, the distance between the outer periphery 54i of the eccentric cam 54b and the inner periphery 64f of the ring-like flange 64b is gradually decreased. Therefore, the stopper catching projection 63f is gradually compressed between the peripheries 54i and 64f. Since the minimum distance a, as shown in FIG. 11(e) between the peripheries 54i and 64f is set to be smaller than the maximum height b of the stopper catching projection 63f, finally the outer periphery 63g of the stopper catching projection 63f tightly fits to the inner periphery 64f of the ring-like flange 64b as shown in FIG. 11(e). Accordingly, the stopper catching projection 63f is strongly clamped between the peripheries 54i and 64f just like a wedge, thereby restricting the rotation of the stopper ring 63.

Since the outer periphery 63g of the stopper catching projection 63f tightly fits to the inner periphery 64f of the ring-like flange 64b, the load is dispersed effectively. Since the load is not locally exerted from the stopper ring 63 to the ring-like flange 64b, the ring-like flange 64b can have less strength. However, the structure is not limited to this and a portion of the outer periphery 63g of the stopper catching projection 63f may be partially in contact with the inner periphery 64f of the ring-like flange 64b.

At this point, since the reel-side stopping projection 64e engages with the stopper catching projection 63f, the rotation of the spool ring 64 is also stopped. Accordingly, the rotation of the reel 4, rotating integrally with the spool ring 64, in the belt withdrawing direction α is also stopped. That is, the spool ring 64 is coupled with the locking base 54 with regard to the relative rotation in the belt withdrawing direction α. As a result of this, the torsion bar 62 is prevented from further being twisted, thereby stopping the withdrawal of the seat belt 3. This means that the occupant can be prevented from moving forward.

As mentioned above, when there is a difference in rotation among the reel 4, the spool ring 64, and the locking base 54, the torsion bar portion 62a is twisted. Therefore, the EA mechanism exhibits its EA function limiting the belt load in the event of the vehicle collision. As the stopper ring 63 comes in contact with the locking base 54, the EA function is finished. Since the maximum twisted amount of the torsion bar 62 is limited by the rotation coupling devices (locking base 54, the stopper ring 63, and the spool ring 64), the failure (breakage) of the torsion bar 62 due to the twisting can be prevented.

According to the seat belt retractor 1 of this embodiment, since arranged within the reel 4 is only the torsion bar 62, the miniaturization of the reel 4 can be effectively achieved. Since the spool ring 64 can be engaged with the locking base 54 only by the movement in the rotational direction, that is, the spool ring 64 never moves in the axial direction, the shortening of the length in the axial direction can be achieved. In addition, since arranged between the reel 4 and the locking base 54 are only the disk-like stopper ring 63 and the spool ring 64, the axial length of the seat belt retractor 1 can be reduced. This means that the seat belt retractor can have a compact construction as a whole.

As apparent from the above description, the present invention exhibits the following effects:

(1) Driving points of a first rotational member can be securely pressed just after the ignition of a gas generator so that a pre-tensioner quickly and securely operates.

(2) When the first rotational member is a ring gear and the second rotational member is a pinion, the speed-up function is achieved. In addition, by changing the gear ratio, the length of a belt to be wound and the force for taking up the belt can be balanced.

(3) When the bottom one of driving members has a sealing function, gas is prevented from leaking, thereby improving the efficiency.

(4) When a case is provided at the terminal end of a passage, the plural driving members are collected in the case, thereby facilitating the maintenance.

Hereinafter, a pre-tensioner according to a second embodiment of the present invention will be described.

In the aforementioned pre-tensioner shown in FIGS. 1 through 4, incorrect engagement between the balls (the driving members) and the ring gear (the first rotational member) can be prevented, thereby securing the operation of the pretensioner.

However, in consideration of the movement after the actuation of a pretensioner, there is a possibility of the following phenomenon in a seat belt retractor having an energy absorbing mechanism (sometimes referred to as EA mechanism) of a torsion-bar type. That is, after the pre-tensioner is actuated when large acceleration of gravity G is exerted on a vehicle body, an occupant moves forward by inertia force and thus a belt tends to be extended. At this point, the EA mechanism is actuated so that the take-up shaft is gradually rotated in a belt withdrawing direction while keeping a certain resisting torque. At this point, in FIG. 4, the ring gear 30 is rotated in a clockwise direction so as to push back the balls 20 into the pipe 21. During this, the balls 20 tend to choke so as to impart resistance force to the ring gear 30. This makes the resisting torque on the reel (take-up shaft) 4 higher than a predetermined level and thus inappropriately increases the tension on the belt.

A pre-tensioner of this embodiment is improved so as not to obstruct the operation of the seat belt retractor after the actuation of the pre-tensioner.

To solve the aforementioned problem, the pre-tensioner of this embodiment comprises a gas generator; a series and plurality of driving members which are accelerated by gas from the gas generator; a passage for guiding the driving members; and a rotational member having a plurality of driving points (levers or the like) which are pressed by some of the accelerated driving members to impart rotational torque, the pre-tensioner being characterized by a mechanism for facilitating the discharge of the driving members left around the driving points of the rotational member after the operation of the pre-tensioner.

After the operation of the pre-tensioner, even when one or more of the driving members such as balls is left around the driving points, the driving members can be easily discharged so as not to obstruct the movement of the rotational member and thus the take-up shaft.

In case of the retractor provided with an energy absorbing mechanism for gradually rotating the take-up shaft in the belt withdrawing direction, when a tension exceeding a predetermined value is exerted to the belt and the energy absorbing mechanism is actuated after the operation of the pre-tensioner, the rotational member tends to move in such a direction that the driving points push back the driving members into the passage according to the rotation of the take-up shaft in the belt withdrawing direction. In case of having such an energy absorbing mechanism, the mechanism for facilitating the discharge of the driving members is a mechanism of deforming or breaking apart of the passage to facilitate the discharge of the driving members out of the passage.

With reference to the drawings, the pre-tensioner according to the second embodiment will be concretely described.

Figure 18:
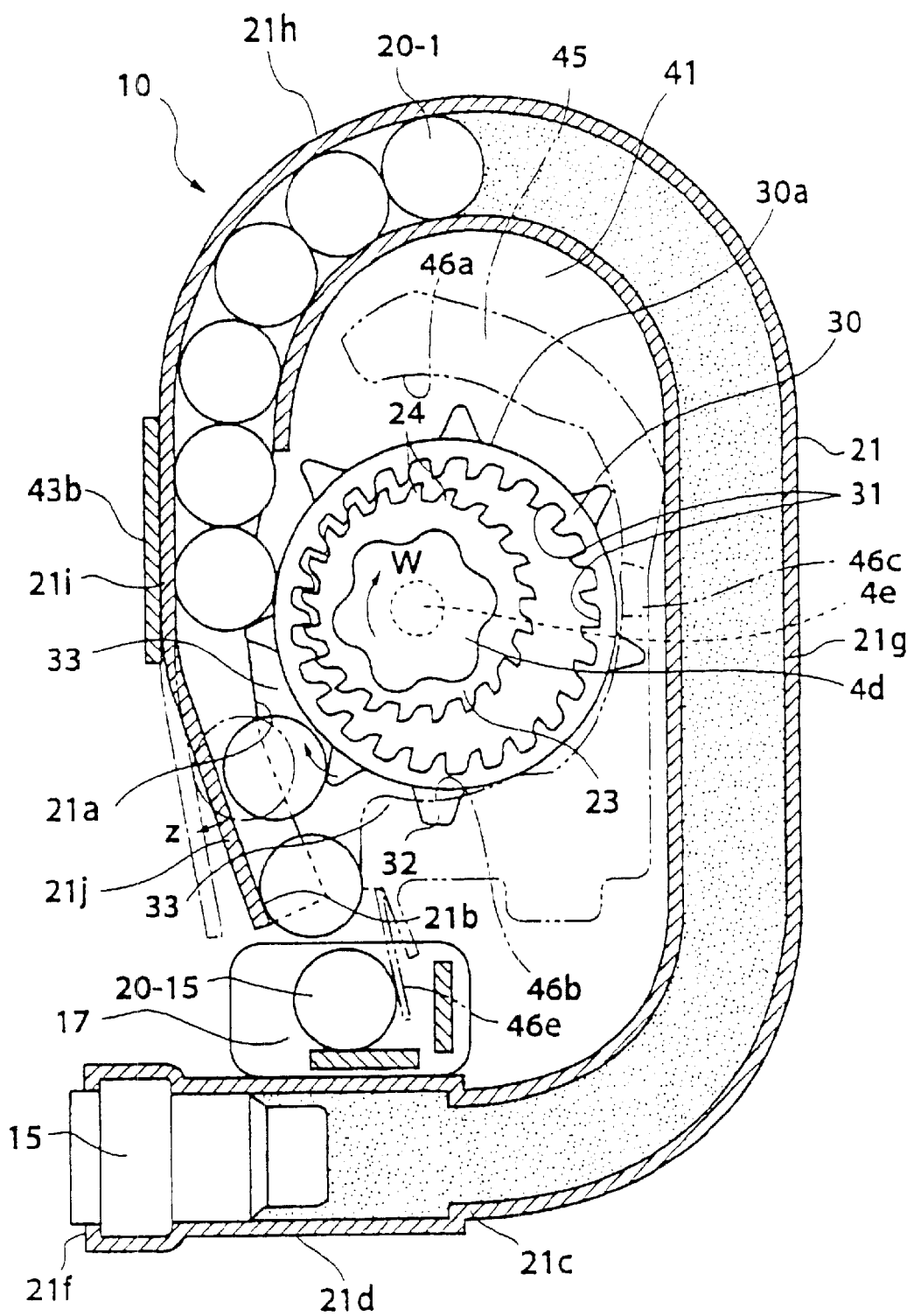
FIG. 18 is a front sectional view showing the operation of a mechanism for discharging balls after the actuation of the pre-tensioner according to a second embodiment of the present invention.
Figure 19:
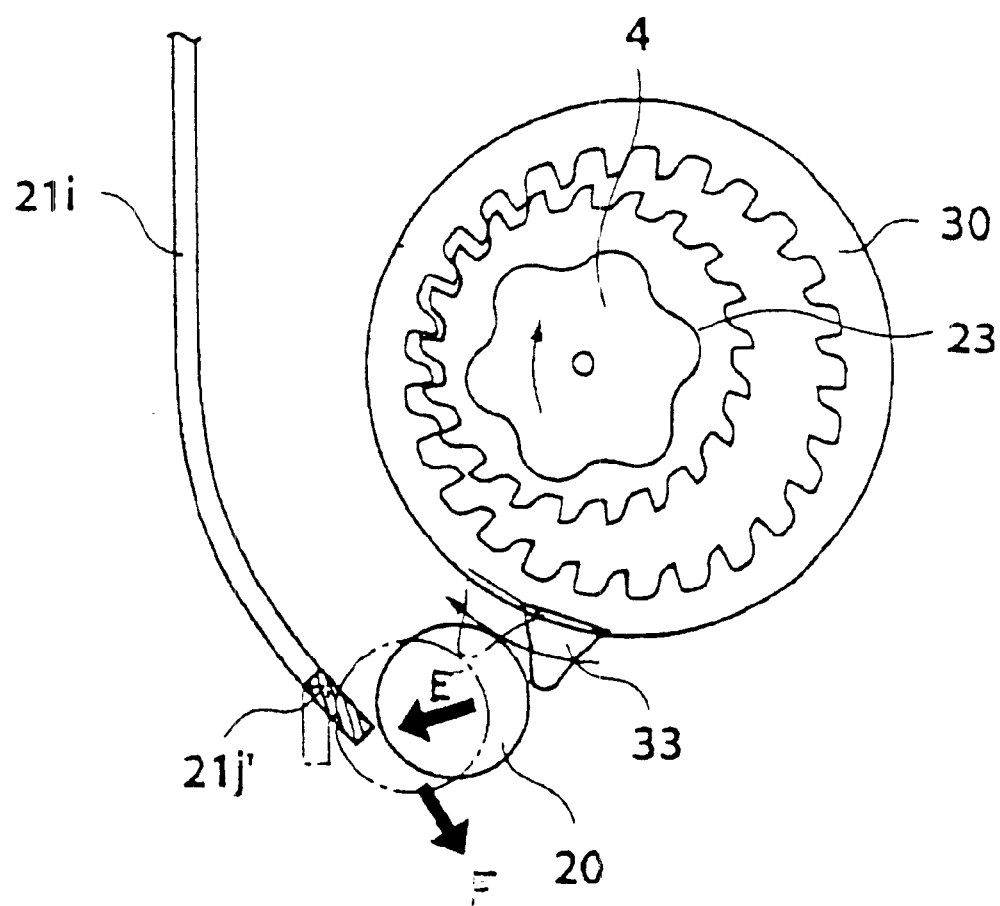
FIG. 19 is a front view showing a variation of the ball discharging mechanism according to a third embodiment of the present invention.
Figure 20:
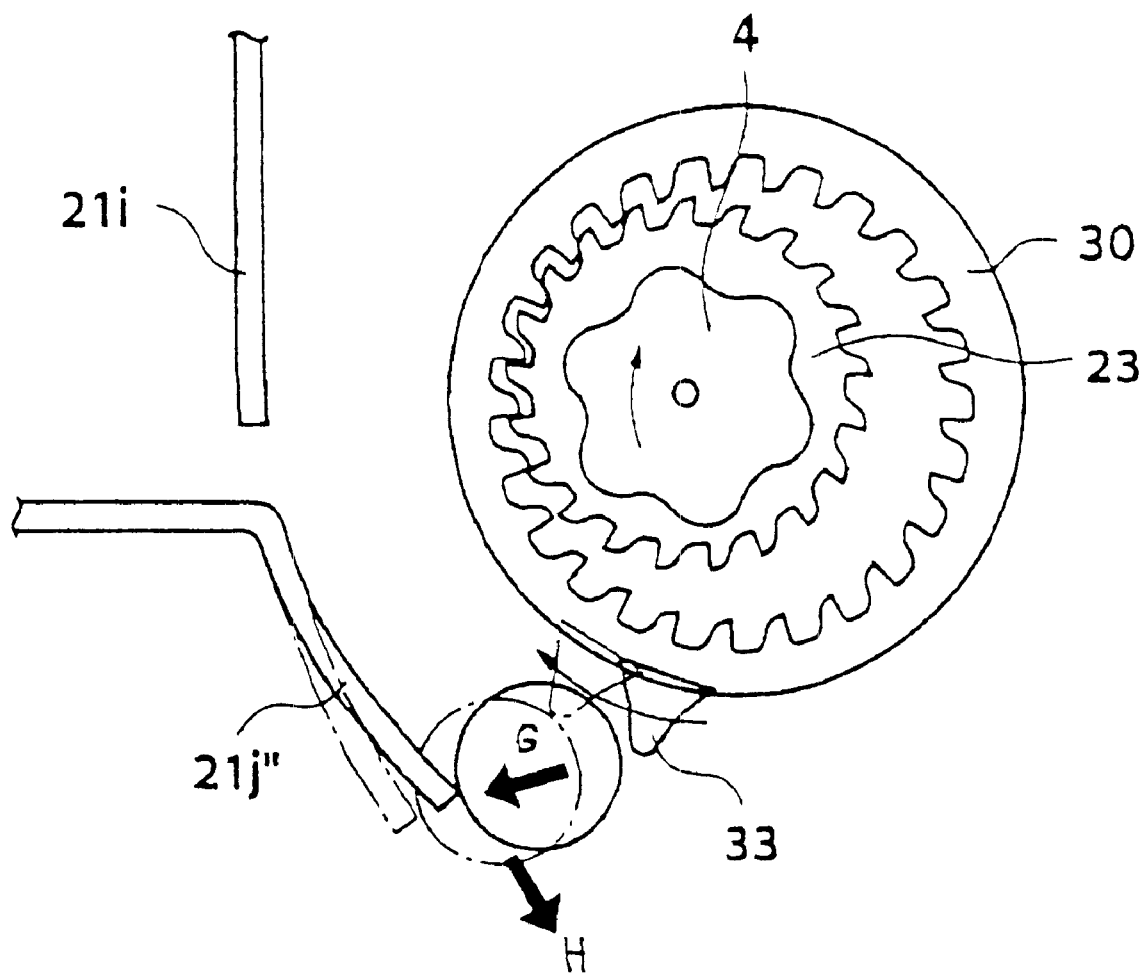
FIG. 20 is a front view showing another variation of the ball discharging mechanism according to a fourth embodiment of the present invention.

FIGS. 18 through 20 show the construction and the operation of the pre-tensioner according to the second, third, and fourth embodiments, respectively, of the present invention. FIG. 18 is a front sectional view showing the operation of a ball discharging mechanism after the operation of the pre-tensioner, the ball discharging mechanism being characteristic of this embodiment. FIG. 19 is a front view showing a variation of the ball discharging mechanism. FIG. 20 is a front view showing another variation of the ball discharging mechanism.

As shown in FIG. 18, in the pre-tensioner of the second embodiment, a straight portion 21*j* of the pipe 21 (the passage for the driving members) at a distal end side (side furthest from the gas generator) has a section consisting of only a part of an annular section of the pipe so that the straight portion 21*j* is easy to be deformed. The action of the straight portion 21*j* as the ball discharging mechanism will be described later.

FIG. 19 demonstrates the third embodiment, which is like the second embodiment except that the straight portion 21*j* of the pipe 21 includes at its end a plastic deformable member (for example, an aluminum block) 21*j'*.

FIG. 20 demonstrates a fourth embodiment of the present invention, which is like the second embodiment, except that an end straight portion 21*j"* is formed separately from a straight portion 21*i* of the pipe 21. In this case, the straight portion 21*i* and the straight portion 21*j"* are arranged to be continued in line. The straight portion 21*j"* is preferably formed of an elastic deformable member (for example, a plate spring or a plastic deformable member (e.g. an aluminum block)).

Hereinafter, the action after the operation of the second embodiment of the pre-tensioner 10 will be described with reference to FIG. 18.

After the operation of the pre-tensioner 10, the belt 3 tends to be withdrawn by the movement of the occupant's body moving forward because of the inertia force. Once the tension thus exerted on the belt exceeds a certain value, the EA mechanism 7 (see FIG. 6) is actuated so that the torsion bar portion 62*a* of the EA mechanism 7 starts its torsional deformation. Then, the reel 4 starts to be gradually rotated in the belt withdrawing direction (the direction of arrow W in FIG. 18) and the seat belt is withdrawn with substantially the same resistance force. According to the rotation of the reel 4 in the belt withdrawing direction, the pinion 23 and the ring gear 30 also tend to rotate in the same direction. The rotation of the ring gear 30 causes such movement as to push back the balls 20 entered in trapezoidal valleys between the levers 33 into the pipe 21. At this point, the balls 20 may choke so as to impart resistance force to the ring gear 30. Therefore, the resistance torque of the reel 4 may exceed the predetermined value and the tension on the seat belt may be inadequately increased.

Once such choking is caused, the end straight portion 21*j* of the pipe 21 receives force by the pushed ball 20 and is thus bent in a direction of arrow Z of FIG. 18. By this bending, the straight portion 21*j* is moved to a position shown by dashed lines of FIG. 18. As a result of this, the passage for the balls 20 is expanded so that the balls 20 left between the levers 33 of the ring gear 30 are discharged in a direction toward the case 17. Therefore, the movement of the ring gear 30 and the reel 40 is never obstructed by the balls 20.

In case of the end straight portion of the pipe 21 including the end member 21j' as shown in FIG. 19 for the third embodiment, when the force of pushing back the ball 20 into the pipe 21 (in a direction of arrow E of FIG. 19) is developed, the end member 21j' is plastically deformed to a position shown by dashed lines of FIG. 19. Because of this plastic deformation of the end member 21j', the balls 20 are flicked out in a direction of arrow F of FIG. 19. In this case also, the balls 20 are easily discharged.

In case of the pipe 21 including the separate straight portion 21j'' consisting of an elastic member as shown in FIG. 20 for the fourth embodiment, when force of pushing back the ball 20 into the pipe 21 (in a direction of arrow G of FIG. 20) is developed, the straight portion 21j'' is elastically deformed to a position shown by dashed lines of FIG. 20. Because of this elastic deformation of the straight portion 21j'', the balls 20 are flicked out in a direction of arrow H of FIG. 20. In this case also, the balls 20 are easily discharged as well as the aforementioned case.

The relation in configurations among the balls, the pipes, and the ring gear of the pre-tensioner will be considered hereinafter.

Figure 21:
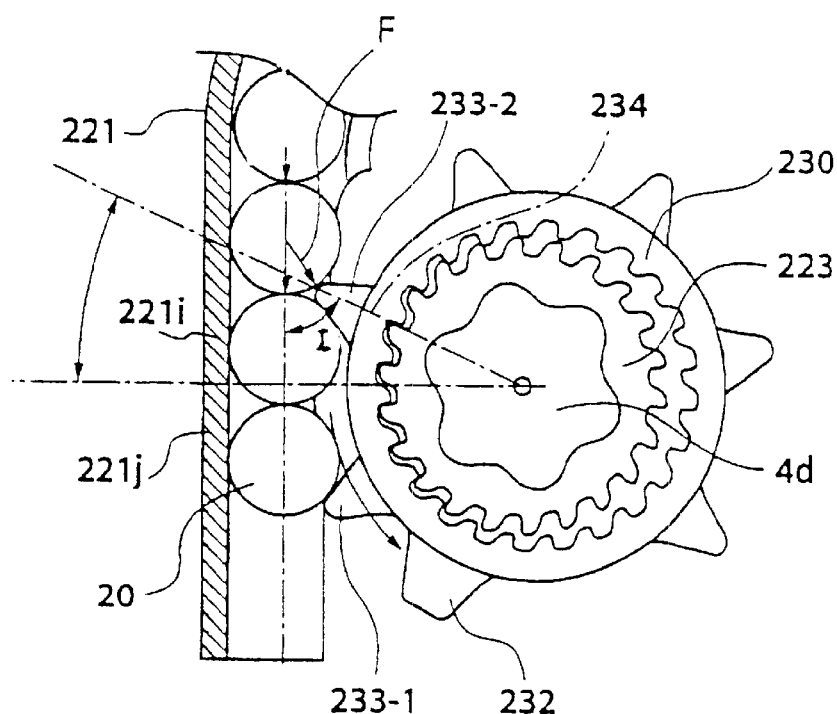
FIGS. 21(A) and 21(B) are front views schematically showing configurations of a power transmitting portion of a pipe 221 and the state when a driving force is transmitted from balls 20 to a ring gear 230 according to fifth and sixth embodiments, respectively, of the present invention.
Figure 21:
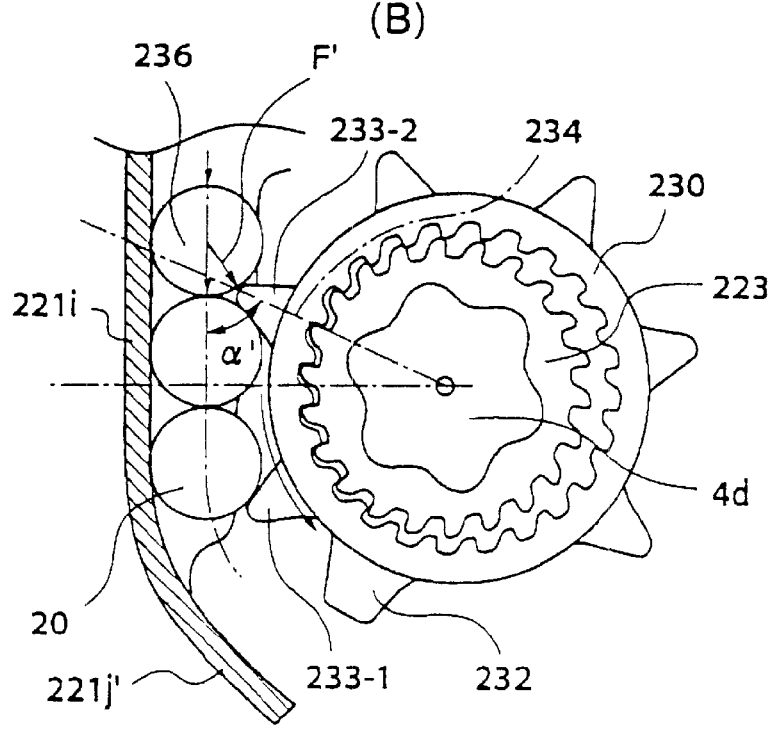
Figure 22:
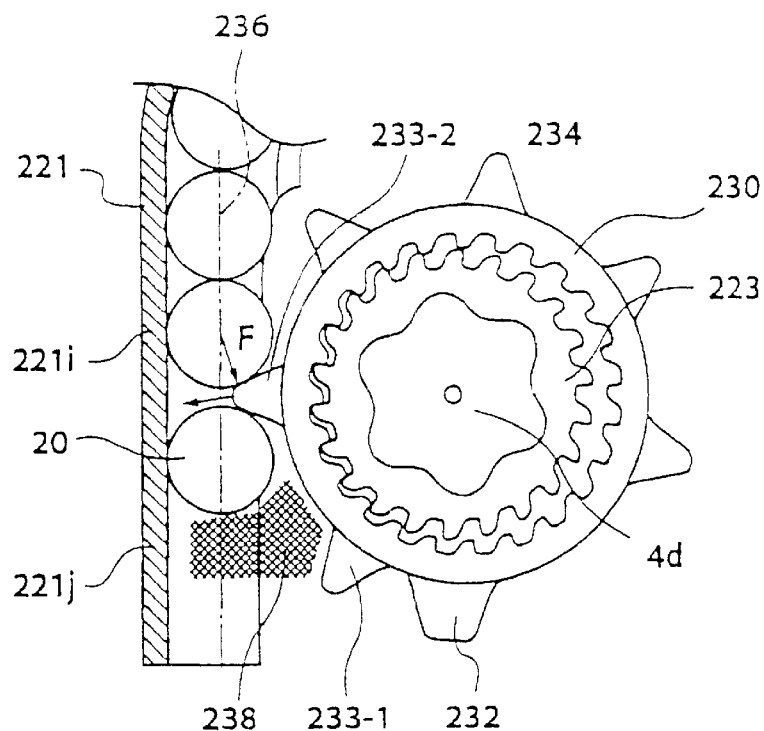
FIGS. 22(A) and 22(B) are schematic front views for explaining configurations of the power transmitting portion of the pipe 221 and the relation in engagement between the ring gear 230 and the pinion 223 according to the fifth and sixth embodiments, respectively.
Figure 22:
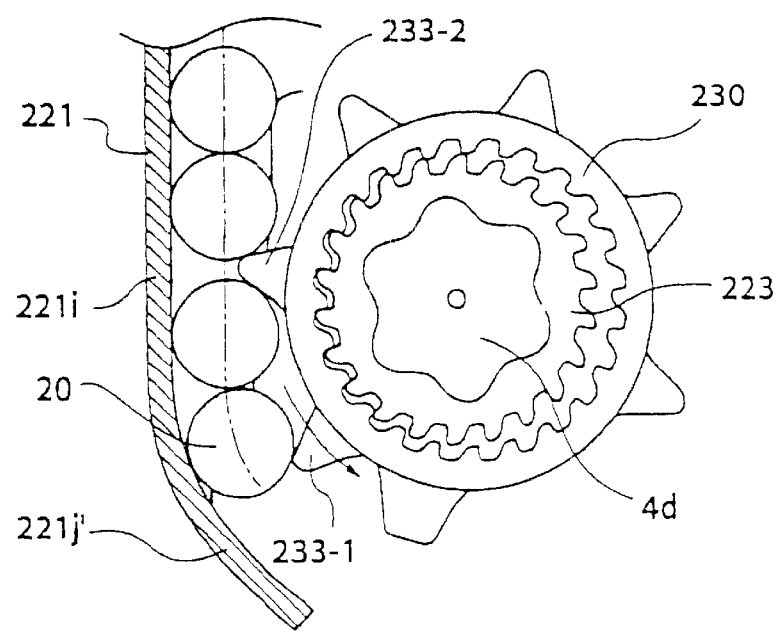
Figure 23:
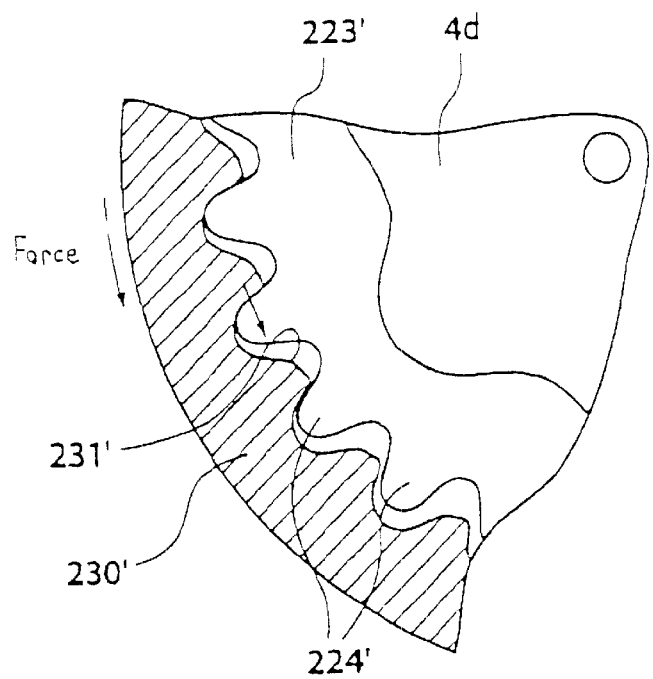
FIGS. 23(A), 23(B) are schematic plan views for considering the configuration of teeth of the ring gear and the pinion according to seventh and eighth embodiments, respectively.
Figure 23:
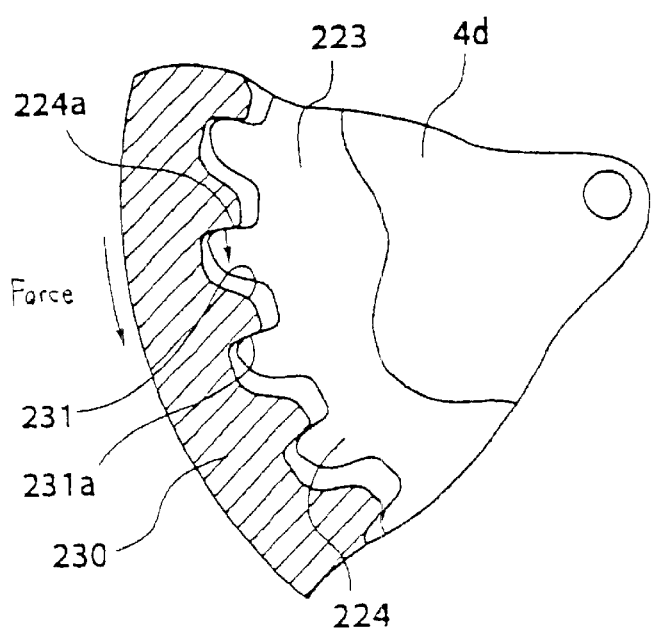
Figure 24:
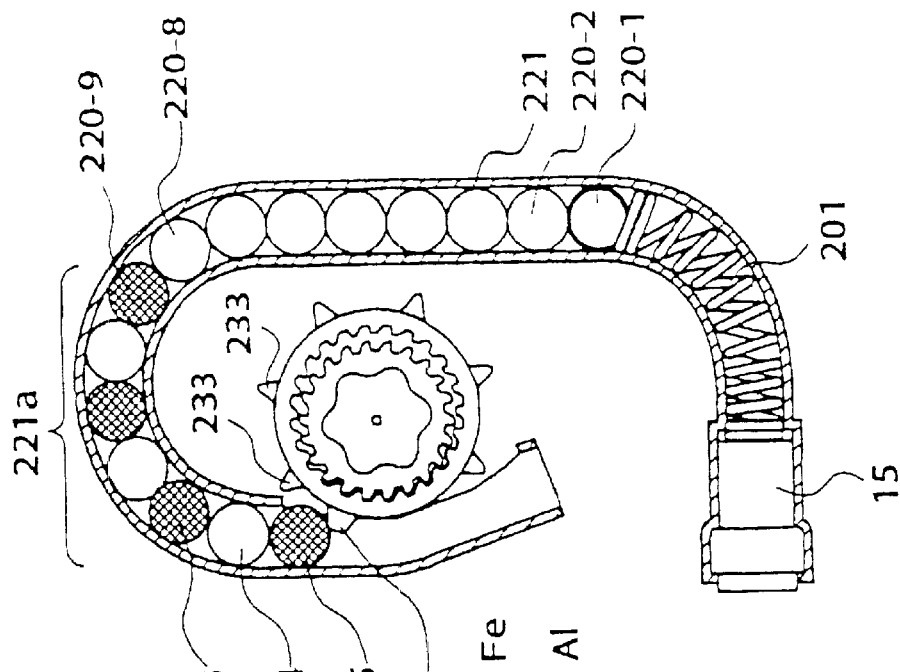
FIGS. 24(A), 24(B) are sectional views showing the arrangement of the balls within the pipe of the pre-tensioner according to ninth and tenth embodiments, respectively.
Figure 24:
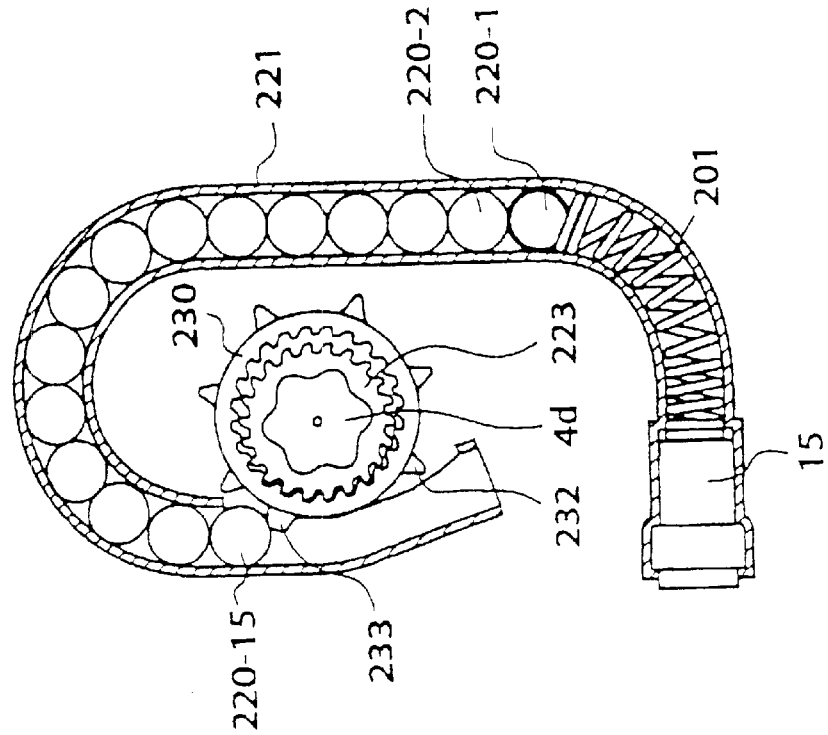

FIGS. 21(A) and 21(B) are front views according to fifth and sixth embodiments, respectively, schematically showing configurations of a power transmitting portion of a pipe 221 (driving member guiding passage) and the state when driving force is transmitted from balls 20 (driving members) to a ring gear 230. FIG. 21(A) illustrates a case of the pipe 221 being straight in the fifth embodiment and FIG. 21(B) illustrates a case of a power transmitting portion (end portion) of the pipe 221 being curved toward the center of the ring gear 230 in the sixth embodiment.

In the illustrated state, the pre-tensioner is operative, the balls 20 move downwardly (in the drawings), and the ring gear 230 is engaged with a pinion 223 and is thus rotated in the counter clockwise direction.

Except as otherwise stated, the structures identified by reference characters in FIG. 21 through FIG. 24 correspond to the structures in the first embodiment, but are preceded with the prefix, "2".

In FIGS. 21(A), 21(B), two levers 233-1 and 233-2 of the ring gear 230 are in contact with the balls 20 in the passage 221. The lever 233-1 positioned lower than the other lever 233-2 moves in advance of the lever 233-2. The lower lever 233-1 is about to separate from the balls 20 and about to be relieved from the reception of driving force from the balls 20. The lever 233-2 advances just following (traces) the lever 233-1 and receives a driving force from balls 20 above the balls 20 imparting the driving force to the lower lever 233-1.

In the fifth embodiment as shown in FIG. 21(A), the end portion 221j of the pipe 221 extends straight so that a surface (power transmitting portion) of the pipe 221 on which the balls 20 in contact with the levers 233 of the ring gear 230 slide is straight. On the other hand, in the sixth embodiment as shown in FIG. 21(B), the end portion 221j' of the pipe 221 is curved toward the center of the ring gear 230 with the result that the power transmitting portion of the pipe is also curved. Therefore, a point, where the lower lever 233-1 separates from the balls 20, of the case shown in FIG. 21(B) is lower than that of the case shown in FIG. 21(A). As well as the lever 233-1, the point of the following lever 233-2 of the case shown in FIG. 21(B) is also lower than that of the case shown in FIG. 21(A).

Description will now be made as regard to an angle I between a line 234 connecting the center of the following lever 233-2 (or a contact point between the lever 233-2 and the ball 20) to the center of rotation of the ring gear 230 (equal to the center of the hexagonal head portion 4d of the reel 4) and the advancing direction of the balls 20 pressing the lever 233-2 (equal to the axial direction of the pipe). The angle I also indicates a position where the upper lever 233-2 starts to receive alone the driving force for rotating the ring gear 230.

In the case shown in FIG. 21(A), the angle I is relatively small (e.g. 65°) so that a vector F of force transmitted from the balls 20 to the lever 233-2 is significantly inclined toward the center of rotation of the ring gear 230, so torque applied to the ring gear 230 by the force F is significantly reduced.

On the other hand, in the case shown in FIG. 21(B), the angle α' is relatively large (e.g. 70°) so that the vector F of force transmitted from the balls 20 to the lever 233-2 is not significantly inclined toward the center of rotation of the ring gear 230, so enough torque can be applied to the ring gear 230.

That is, in the case shown in FIG. 21(A), since the distance between the center of rotation of the ring gear 230 and the contact point between the ball and the lever 233-1 for switching the power transmission to the lever 233-2 is long, the force from the balls is distributed to a direction toward the center of the rotation, causing power loss. In the case shown in FIG. 21(B), however, the end portion 221j' of the pipe is curved, thereby lengthening a time period of the balls pressing the lower lever 233-1. As a result of this, the timing of switching the power transmission to the upper lever 233-2 is delayed, thus shortening the distance between the center of rotation and the contact point between the ball and the lever 233-2 for switching the power transmission to the lever 233-2. Therefore, power loss is reduced.

It should be understood that the pre-tensioner shown in FIG. 1 has the end portion 21j of the pipe 21 which is inclined toward the center of rotation of the ring gear 30, thereby exhibiting similar effect.

FIGS. 22(A) and 22(B) are schematic front views for explaining configurations of the power transmitting portion of the pipe 221 and the relation in engagement between the ring gear 230 and the pinion 223.

Also in this case, FIG. 22(A) illustrates the fifth embodiment of the end portion 221j of the pipe 221 being straight while FIG. 22(B) illustrates the sixth embodiment of the end portion 221j' of the pipe 221 being curved toward the center of the ring gear 230.

In FIG. 22(A), only one lever 233-2 engages the balls 20. At this point, a space 238 exists between the inside (right side in the drawing) of the ball and the ring gear 230. At this point, the component, directed toward the center of rotation, in the force F of the balls 20 pressing the lever 233-2 is small. Accordingly, there is a possibility that the ring gear 230 is accidentally moved to the left of this drawing so as to disengage from the pinion 223.

In the case shown in FIG. 22(B), however, the end portion 221j' of the pipe is curved toward the center of rotation of the ring gear 230 so that the balls 20 even in the end portion 221j' engage the lever 233-1, thereby preventing the movement of the ring gear 230 in direction of disengaging from the pinion 223. There is no possibility of disengagement between the ring gear 230 and the pinion 223.

FIGS. 23(A), 23(B) are schematic plan views for considering the configuration of teeth of the ring gear and the pinion according to a seventh and eighth embodiment, respectively.

FIG. 23(A) demonstrates a seventh embodiment, which is similar to any of the previous embodiments, except that internal teeth 231' of a ring gear 230' and external teeth 224' of a pinion 223' are basically formed in the involute profile and their pressure angle is 20°. The heads of the internal teeth 231' are partially cut to facilitate the engagement. In this clutch mechanism, since the axis of the ring gear 230' is not fixed (i.e. the ring gear 230' is a floating gear), there is a possibility that the ring gear 230' is pressed to the left in the drawing by the contact force between the teeth 224' and 231', causing disengagement between the teeth. Ring gear 230' is urged by force in the direction shown.

FIG. 23(B) demonstrates an eighth embodiment, which is similar to any of the previous embodiments, except that contact surfaces 224a, 231a of the teeth 224, 231 are steeply formed to have pressure angles smaller than 20°. It should be noted that these contact surfaces 224a, 231a come in contact with each other when the pre-tensioner is operative. The lower limit of the pressure angle is 0° or smaller (including a negative angle), i.e. a one-way angle, not to interfere the engagement of the gears. Examples of the pressure angle may include 0° and 10°.

Also in the pre-tensioner shown in FIG. 18, the contact surfaces of the teeth are steeply formed just like those shown in FIG. 23(B).

Hereinafter, the materials of the balls and the means for biasing the balls will be described.

FIGS. 24(A), 24(B) are sectional views showing the arrangement of the balls within the pipe of the pre-tensioner according to a ninth and tenth embodiment, respectively.

In the ninth embodiment as shown in FIG. 24(A), the ball 220-1, nearest to the gas generator 15, is made of silicone rubber to function as a piston and the other balls are made of steel (hardness HRC50 or more). The steel ball has a hardness higher than an aluminum ball so as to provide smaller deformation and smaller friction, thereby exhibiting effects which will be described later.

In this case, a coil spring 201 for biasing the ball 220-1 toward the head is disposed between the ball 220-1 and the gas generator 15. By the biasing force of the coil spring 201, the head ball 220-15 is in contact with a lever 232.

In this case, a coil spring 201 for biasing the ball 220-1 toward the head is disposed between the ball 220-1 and the gas generator 15. By the biasing force of the coil spring 201, the head ball 220-15 is in contact with a lever 232.

In the tenth embodiment as shown in FIG. 24(B), the materials of the balls are selected as follows. Balls 220-2 through 220-8 which are accelerated and shot through a portion 221a of the pipe 221 after the actuation of the pre-tensioner are made of steel so as to reduce the frictional resistance between the pipe 221 and the balls 220. The head ball 220-15 may come in contact with the lever 232 of the ring gear and is made of aluminum. Because the head ball 220-15 functions just to engage the gears, significant force is not applied to the head ball 220-15. For this reason and for lightening the weight of the pre-tensioner, the head ball is made of aluminum. For other balls, balls to be in contact with levers 233 of the ring gear are made of steel and balls not to be in contact with the levers 233 are made of aluminum. This is for lightening the weight and reducing the frictional resistance and the cost.

Now, description will be made with regard to problems to be caused by using soft balls made of aluminum at positions where high load may be applied.

According to the high power of the pre-tensioner, the ball may be deformed in the following state due to an increase in the load applied to the ball 220 during the operation of the pre-tensioner.

(1) Adjacent balls are pressed by each other in the pipe 221 so that the contacts of the balls are deformed.

(2) A ball is pressed against the wall of the pipe 221 by the adjacent ball so that the contact of the ball to the wall is deformed.

(3) A ball is pressed against the lever 233 of the ring gear so that the contact of the ball to the lever 233 is deformed.

When one or more of the balls are deformed, the following faults may occur.

(1) The deformed ball can not smoothly move within the pipe 221 when the pre-tensioner is operative.

(2) The contact surface between balls or between the ball and the wall of the pipe 221 is increased due to the deformation, with the result that the frictional resistance is increased and power loss is caused. Particularly in case of a miniaturized pre-tensioner, the frictional resistance significantly affects the operation.

(3) As the deformation progresses, the balls do not rotate the levers 233 of the ring gear when the pre-tensioner is operative and may be passed through a space between the lever 233 of the ring gear and the pipe 221.

Accordingly, it is preferable that the balls having enough hardness as mentioned above are employed to prevent the aforementioned faults.

Further, a pre-tensioner and a seat belt retractor according to an eleventh embodiment will be described. FIG. 25(A) is a sectional view showing the constructions of a pre-tensioner and a seat belt retractor according to the eleventh embodiment. FIG. 25(B) is an enlarged exploded perspective view showing the details of connections of a frame, a pin, a pipe and a guide block of the seat belt retractor shown in FIG. 25(A). FIG. 26 is an exploded perspective view showing components of a pre-tensioner and a seat belt retractor according to the embodiment. FIG. 27(A) is an enlarged view showing the details of connections of a frame (base unit), a pin, a pipe, and a guide block of the seat belt retractor shown in FIG. 25(A).

Figure 26:
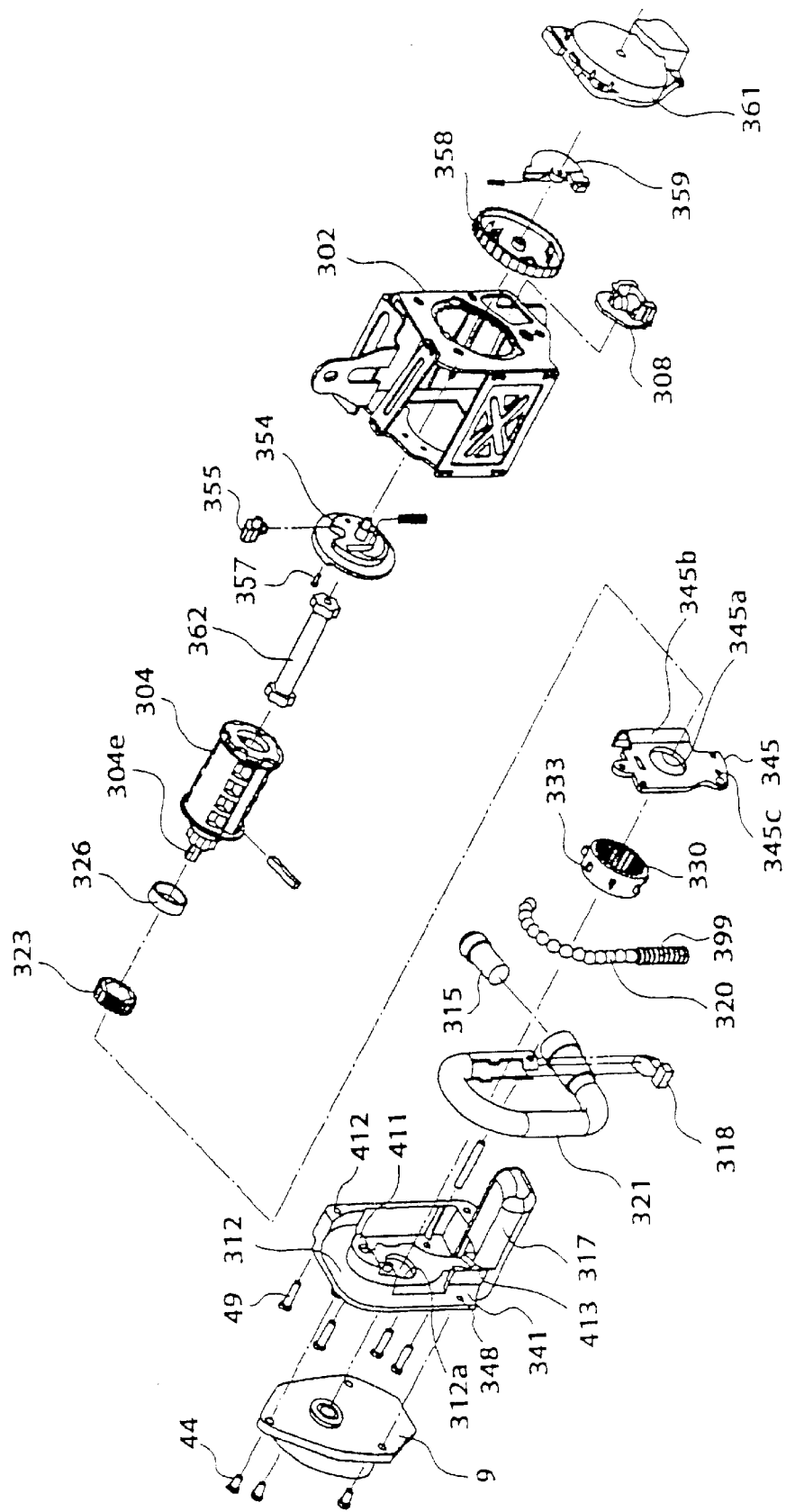
FIG. 26 is an exploded perspective view showing components of a pre-tensioner and a seat belt retractor according to the eleventh embodiment.
Figure 27:
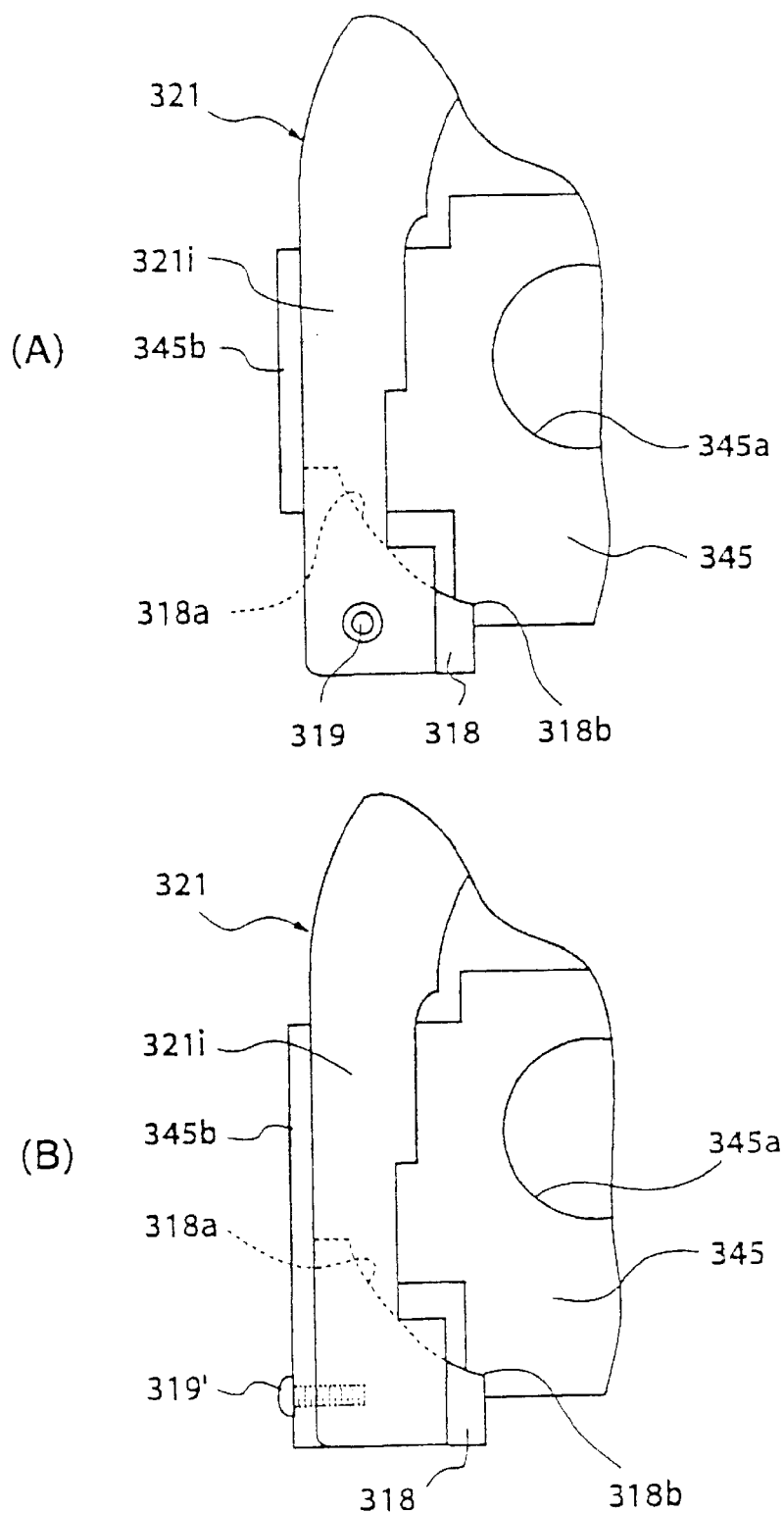
FIG. 27(A) is an enlarged view showing the details of connections of a frame (base unit), a pin, a pipe, and a guide block of the seat belt retractor shown in FIG. 25(A) according to the eleventh embodiment.
FIG. 27(B) is an enlarged view showing a twelfth embodiment of the present invention, which is similar to that shown in FIG. 27(A).

FIG. 27(B) is an enlarged view showing a twelfth embodiment of the present invention, which is similar to that shown in FIG. 27(A). The pre-tensioners and the seat belt retractors shown in FIGS. 25(A) through 27(B) are improvements of the pre-tensioner and the seat belt retractor shown in FIGS. 1 through 14 for the first embodiment.

Figure 25:
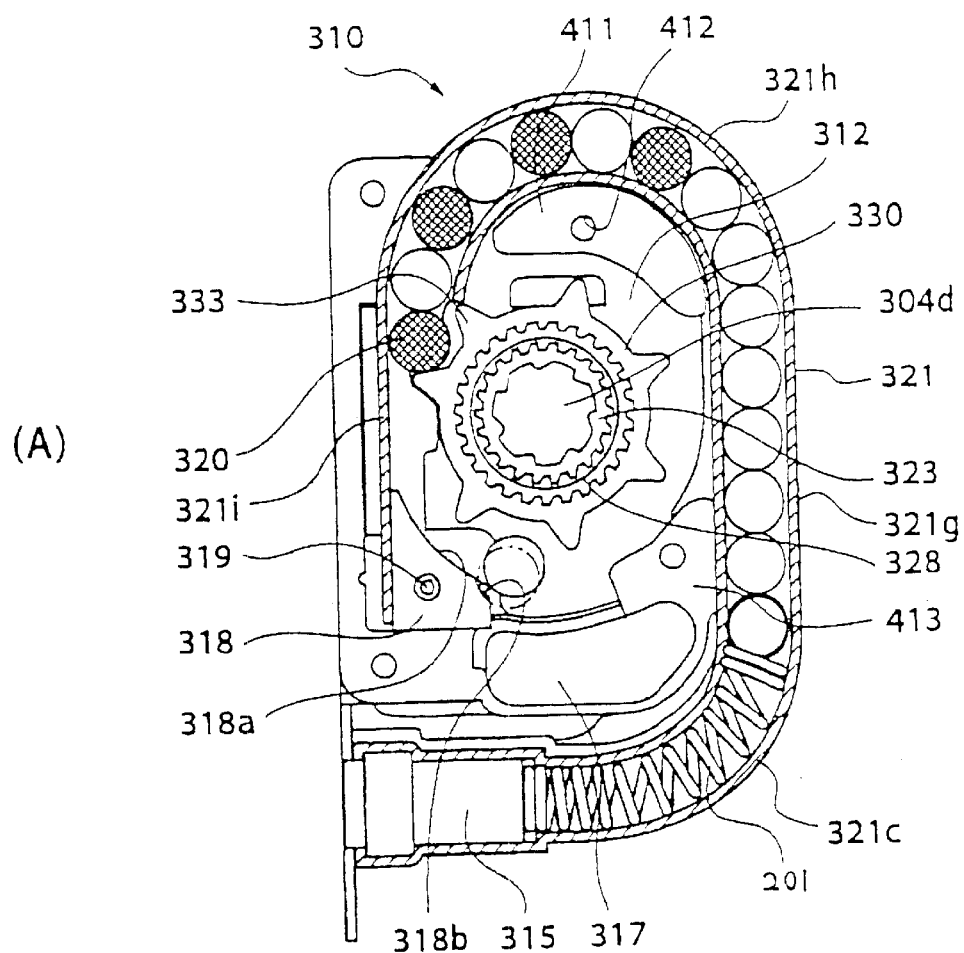
FIG. 25(A) is a sectional view showing the constructions of a pre-tensioner and a seat belt retractor according to an eleventh embodiment.
FIG. 25(B) is an enlarged exploded perspective view showing the details of connections of a frame, a pin, a pipe and a guide block of the seat belt retractor shown in FIG. 25(A) according to the eleventh embodiment.
Figure 25:
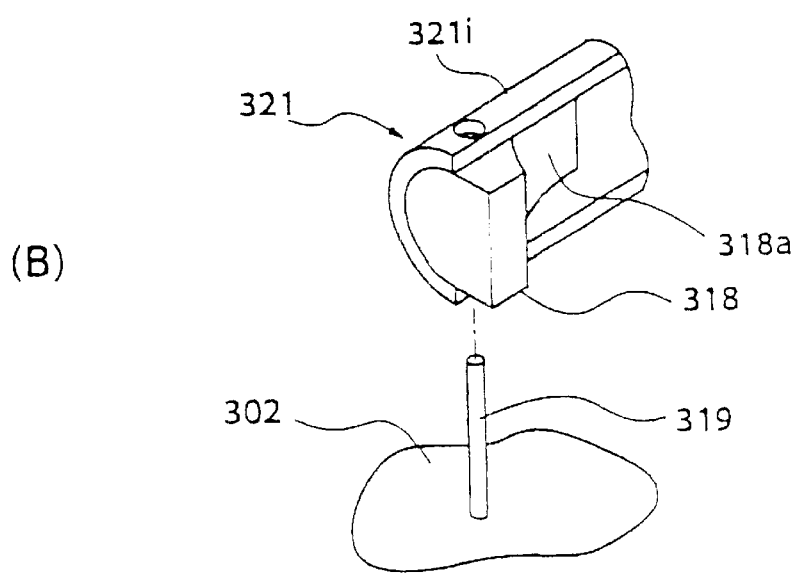

Except as otherwise stated, the structures identified by reference characters FIGS. 25 through 27 correspond to the structures in the first embodiment, but are preceded with the prefix, "3".

A seat belt retractor 310 according to the eleventh embodiment shown in FIGS. 25(A) through 26 is different from the seat belt retractor 1 shown in FIG. 5 in the following points.

(1) Cover 341

This cover 341 is a member corresponding to the base 41 of the seat belt retractor 1 of FIG. 5. The configuration of the cover 341 is significantly different from the base 41 and the cover 341 is incorporated with other parts such as a ball case. The details of the cover 341 will be described later.

(2) Guide Block 318

This guide block 318 is a member corresponding to the end portion 21j (21j' in FIG. 19, 21j'' in FIG. 20) of the pipe 21 of the seat belt retractor of FIG. 5. It should be noted that a pipe 321 is substantially the same as the pipe 21 shown in FIG. 5 and other drawings. The pipe 321 comprises a proximal end 321c, a straight portion 321g, a semicircular portion 321h, a straight portion 321i, and an end opening 321b.

(3) Plate 345

The seat belt retractor 1 of FIG. 5 has no member corresponding to this plate 345. The plate 345 is an additional member of this embodiment.

(4) Locking Base 354 and Pawl 355

The locking base 354 and the pawl 355 are members corresponding to the locking base 54 and the pawl 55 in the seat belt retractor 1 of FIG. 5, respectively. The locking base 354 and the pawl 355 are different in their configurations from the locking base 54 and the pawl 55 shown in FIG. 5.

(5) Pin 319, Screw 319'

In the seat belt retractor 1 of FIG. 5, the pipe 21 is fixed to the base 41 by brazing or welding. In FIGS. 25(A) through 27(A), the pipe 321 and the guide block 318 of the seat belt retractor 310 are fixed to a frame 302 by the pin 319.

The screw 319' shown in FIG. 27(B) for the twelfth embodiment is used for integrally connecting the pipe 321, the guide block 318 and the plate 345 in the seat belt retractor 310.

(6) Form for Initially Positioning the Ring Gear 330

In the seat belt retractor 1 of FIG. 5, the ring gear 30 is initially positioned by the gear holder 45. In the seat belt retractor 310 of FIGS. 25(A) through 27(B), the ring gear 330 is initially positioned by fitting shear pins (not shown) standing on the cover 341 into chamfered holes formed in the ring gear 330.

The cover 341 will now be explained in detail.

The cover 341 comprises a base plate 312 which is an aluminum die casting like a flat plate. The base plate 312 is provided with a through hole 312a formed in substantially the center thereof. A spring biased shaft 304e of a reel 304 is inserted into the through hole 312a. The base plate 312 is also provided with three mounting holes 342b into which screws 44 (substantially the same as the screws shown in FIG. 5) for fixing the return spring 9 to the cover are inserted.

As for the base plate 312, a surface to which the pipe 321 is attached will be referred to as a pipe-side surface and a surface to which the return spring 9 is attached will be referred to as a spring-side surface.

The base plate 312 is provided with mainly two pipe guides 411, 413 on the pipe-side surface. The pipe guides 411, 413 are formed integrally with the base plate 312 in such a manner as to project from the pipe-side surface of the base plate 312. The pipe guide 411 guides the inner side of the semicircular portion 321h of the pipe 321. The pipe guide 413 guides the inner side of a proximal end portion of the straight portion 321 of the pipe 321. The pipe guides 411, 413 are provided with mounting holes 412 and the like formed therein, into which rivets 49 (substantially the same as the rivets shown in FIG. 5) for fixing the cover 341 and the plate 345 to the side wall of the frame 302.

On a portion of the pipe-side surface of the base plate 312 near the lower edge, the ball case 317 is formed between the pipe guides 411 and 413. Though the case 17 of FIG. 5 is fixed to the base 41 by the rivets 19, the ball case 317 of this embodiment is formed integrally with the base plate 312. The ball case 317 is arranged to collect the balls 320 discharged from the pipe 321. By this case 317, the balls 320 discharged from the pipe 321 are collected.

Hereinafter, the guide block 318 will be explained in detail.

The guide block 318 is an aluminum die casting. The guide block 318 is assembled at the end of the pipe 321. As shown in FIG. 25(B), the guide block 318 is fixed in the assembled state by the pin 319 being press fitted or threaded into the frame 302. The guide block 318 has a passage surface 318a smoothly curved. The passage surface 318a composes a portion of the passage for the balls 320 between the straight portion 321i of the pipe 321 and the ball case 317.

When the movement of pushing back the balls 320 into the pipe 321 is caused, the guide block 318 receives force from pushed ball 320 so as to plastically deform at its end portion 318b. This widens the passage for the balls 320, thereby facilitating the discharge of the balls 320. Therefore, in this embodiment also, the balls 320 can be easily discharged toward the case 317 so as not to obstruct the operation of the ring gear and the reel.

Hereinafter, the plate 345 will be explained in detail.

The plate 345 is a metallic member to be disposed between the pipe 321 and the frame 302. The plate 345 is provided with a through hole 345a formed at substantially the center thereof. The spring biased shaft 304e of the reel 304 is inserted into the through hole 345a. The plate 345 is provided with a pipe covering portion 345b formed on one side thereof, the pipe covering portion 345b having a half cylindrical shape. The pipe covering portion 345b covers the outside of the straight portion 321i of the pipe 321. The plate 345 is provided with holes 345c through which the rivets 49 are inserted.

The pin 319 and the screw 319' will now be explained in detail.

As shown in FIG. 27(A) for the eleventh embodiment, the pin 319 is press fitted into the frame 302. The pin 319 may be threaded into the frame 302. Both the pipe 321 and the guide block 318 are secured to the frame 302 by inserting the guide block 318 into the pipe 321 and inserting the pin 319 into the respective holes of the pipe 321 and the guide block 318.

In the twelfth embodiment shown in FIG. 27(B), the pipe 321, the guide block 318, and the plate 345 are integrally connected by the screw 319'. In this case, the pipe covering portion 345b of the plate 345 is formed to extend to a level of the lower end of the guide block 318.

It should be noted that the guide block 318 may be fixed by using both the pin 319 and the screw 319'. In this case, the pin 319 of FIG. 27(A) is added to the example of FIG. 27(B). By using both the pin 319 and the screw 319', the pipe 321, the guide block 318, and the plate 345 can be further securely connected to each other.

Though the upper end of the guide block 318 has a step in FIGS. 27(A), 27(B), the step can be eliminated and the upper end of the guide block may be flat relative to the inner surface of the pipe 321.

While the present invention has been described with reference to particular embodiments and examples of the pre-tensioner by using the drawings, it should be understood that the present invention is not confined to the details described herein and various changes and modifications may be made without departing from the present invention, the scope of which is to be limited only by the following claims.

The priority document here, U.S. Provisional Application No. 60/121,917, filed Feb. 26, 1999, (including its specification, drawings, and claims), is hereby incorporated by reference into this application.

| Explanation of Reference Signs in Drawings | |
|---|---|
| 1 | seat belt retractor |
| 2 | frame |
| 3 | belt |
| 4 | reel |
| 4a | belt taking-up portion |
| 4b, 4c | flange |
| 4d | hexagonal head portion |
| 4e | spring-force applying shaft |
| 4f | projection |
| 4g | spool ring supporting portion |
| 4h | hole |
| 5 | locking means |
| 6 | emergency locking mechanism |
| 7 | EA mechanism |
| 8 | deceleration detecting means |
| 9 | return spring |
| 10 | pre-tensioner |
| 15 | gas generator |
| 17 | case |
| 20 | ball |
| 21 | pipe |
| 21a | cut-out |
| 21b | end opening |
| 21c | start end |
| 21d | pressure vessel |
| 21f | flange |
| 21g | straight portion |
| 21h | semicircular portion |
| 21I, 21j | straight portion |
| 23 | pinion |
| 24 | external teeth |
| 25, 26 | pin |
| 28 | projection |
| 30 | ring gear |
| 30a, 30b | outer periphery |
| 31 | internal teeth |
| 32, 33 | lever |
| 41 | base |
| 42 | base plate |
| 42a | through hole |
| 42b, 42c, 42d | mounting hole |
| 43a–43h | guide plate |
| 44 | screw |
| 45 | gear holder |
| 46 | backing plate |
| 46a, 46b | inner periphery |
| 46c | hinge portion |
| 46e | fin |
| 47 | side plate |
| 49 | rivet |
| 50, 41 | side wall |
| 50a, 51a | large hole |
| 51b | mounting hole |
| 52 | backing plate |
| 53 | gear member |
| 53a | internal teeth |
| 54 | locking base |
| 55 | pawl |
| 55a | hole |
| 58 | lock gear |
| 61 | retainer housing |
| 62 | torsion bar |
| 63 | stopper ring |
| 64 | spool ring |
| 69 | bush |
| 71 | bush shaft |
| 100 | concavity |
| 101 | take-up shaft |
| 103, 104 | drive wheel half |
| 103a, 104a | concavity |
| 105 | drive wheel |
| 105a | tooth |
| 105b | concavity |
| 106 | gear |
| 110 | groove |
| 112 | CUP |
| 114 | sword box |

-continued

| Explanation of Reference Signs in Drawings | |
|---|---|
| 115 | gas generator |
| 116, 117 | guide plate |
| 118 | tube |
| 118a | opening |
| 120 | mass ball |
| 121 | piston |
| 201 | coil spring |
| 220 | ball |
| 221 | pipe |
| 221a | R portion |
| 221j, 221j' | end portion |
| 223 | pinion |
| 224' | external tooth |
| 224a | surface to be contact with internal tooth |
| 230 | ring gear |
| 231 | internal tooth |
| 231a | surface to be contact with external tooth |
| 233 | lever |
| 234 | line connecting the center of rotation and the axis of the hexagonal head portion |
| 341 | cover |
| 302 | frame |
| 304 | reel |
| 304e | spring biased shaft |
| 310 | seat belt retractor |
| 312 | base plate |
| 312a | through hole |
| 317 | ball case |
| 318 | guide block |
| 318a | passage surface |
| 319 | pin |
| 321 | pipe |
| 321b | end opening |
| 321c | proximal end |
| 321g | straight portion |
| 321h | semicircular portion |
| 321I | straight portion |
| 342b | mounting hole |
| 345 | plate |
| 345a | through hole |
| 345b | pipe covering portion |
| 345c | hole |
| 354 | locking base |
| 355 | pawl |
| 411, 413 | pipe guide |
| 412 | mounting hole |

What is claimed is:

1. A pre-tensioner which rotates a take-up shaft of a seat belt retractor in the belt take-up direction to impart pre-tension on a belt in case of emergency, the pre-tensioner comprising:

a gas generator;

a plurality of driving members which are accelerated by gas from the gas generator;

a passage for guiding the driving members;

a ring gear having a plurality of levers on the outer periphery thereof which are pressed by some of the driving members to receive a driving force;

a pinion having external teeth and being fixed to the take-up shaft, the ring gear having internal teeth engageable with the external teeth; and a clutch mechanism disposed between the ring gear and the pinion, wherein the clutch mechanism engages the internal teeth of the ring gear with the external teeth of the pinion such that the accelerated driving members press the levers of the ring gear to move the ring gear;

the clutch mechanism is not coupled before the pre-tensioner is actuated, as the ring gear rotates when the pre-tensioner is operative, the clutch mechanism is coupled, and wherein a head one of the driving members is substantially in contact with one of the driving points of the ring gear.

2. The pre-tensioner as claimed in claim 1, wherein the driving members are balls, and wherein the passage is a curved pipe.

3. The pre-tensioner as claimed in claim 1, wherein a bottom one of the driving members has a sealing function for preventing gas leakage toward the head driving member, and wherein the other driving members are relatively loosely fitted in the passage.

4. The pre-tensioner as claimed in claim 1, further comprising a spring biasing a bottom one of the driving members toward the head one of the driving members.

5. The pre-tensioner as claimed in claim 2, wherein a bottom one of the driving members has a sealing function for preventing gas leakage toward the head driving member, and wherein the other driving members are relatively loosely fitted in the passage.

6. A pre-tensioner which rotates at take-up shaft of a seat belt retractor in the belt take-up direction to impart pre-tension on a belt in case of emergency, the pre-tensioner comprising:
   a gas generator;
   a plurality of driving members which are accelerated by gas from the gas generator;
   a passage for guiding the driving members;
   a rotational member having a plurality of driving points which are pressed by some of the accelerated driving members to impart rotational torque;
   a mechanism for facilitating the discharge of the driving members left around the driving points of the rotational member after the operation of the pre-tensioner; and
   an energy absorbing mechanism which gradually rotates the take-up shaft in the belt withdrawing direction when tension exceeding a predetermined value is exerted on the seat belt, wherein when the energy absorbing mechanism is actuated after the operation of the pre-tensioner, the passage is configured to partially deform or break.

7. A pre-tensioner which rotates a take-up shaft of a seat belt retractor in the belt take-up direction to impart pre-tension on a belt in case of emergency, the pre-tensioner comprising:
   a gas generator;
   a plurality of driving members which are accelerated by gas from the gas generator;
   a passage for guiding the driving members;
   a rotational member having a plurality of driving points which are pressed by some of the accelerated driving members to impart rotational torque; and
   wherein a part of the passage is constructed to be deformed or broken to facilitate the discharge of the driving members out of the passage when the rotational member tends to move in such a direction that the driving points of the rotational member push back the driving members into the passage according to a rotation of the take-up shaft in the belt withdrawing direction.

8. A pre-tensioner which rotates a take-up shaft of a seat belt retractor in the belt take-up direction to impart pre-tension on a belt in case of emergency, the pre-tensioner comprising:
   a gas generator;
   a plurality of driving members which are accelerated by gas from the gas generator;
   a passage for guiding the driving members;
   a first rotational member having a plurality of driving points which are pressed by some of the driving members to receive a driving force;
   a second rotational member fixed to the take-up shaft; and
   a clutch mechanism disposed between the first rotational member and the second rotational member, wherein
     the second rotational member is a pinion having external teeth,
     the first rotational member is a ring gear having internal teeth to be engaged with the external teeth of the pinion and having levers as the driving points on the outer periphery thereof,
     the clutch mechanism engages the internal teeth of the ring gear with the external teeth of the pinion by the accelerated driving members pressing one or more of the levers of the ring gear to move the ring gear, and
     the driving members and the passage are configured to prevent the ring gear from moving in a direction of disengaging the ring gear from the pinion at a power transmitting portion.

9. The pre-tensioner as claimed in claim 8, wherein the power transmitting portion of the passage is curved toward the center of rotation of the rotational member.

10. A pre-tensioner which rotates a take-up shaft of a seat belt retractor in the belt take-up direction to impart pre-tension on a belt in case of emergency, the pre-tensioner comprising:
   a gas generator;
   a plurality of driving members which are accelerated by gas from the gas generator;
   a passage for guiding the driving members;
   a first rotational member having a plurality of driving points which are pressed by some of the driving members to receive a driving force;
   a second rotational member fixed to the take-up shaft; and
   a clutch mechanism disposed between the first rotational member and the second rotational member, wherein
     the second rotational member is a pinion having external teeth,
     the first rotational member is a ring gear having internal teeth to be engaged with the external teeth of the pinion and having as the driving points levers on the outer periphery thereof,
     the clutch mechanism engages the internal teeth of the ring gear with the external teeth of the pinion by the accelerated driving members pressing one or more of the levers of the ring gear to move the ring gear,
     surfaces of the external teeth and the internal teeth, which come in contact with each other when the driving members rotate the ring gear, have pressure angles smaller than 20°.

11. A pre-tensioner which rotates a take-up shaft of a seat belt retractor in the belt take-up direction to impart pre-tension on a belt in case of emergency, the pre-tensioner comprising:
   a gas generator;
   a plurality of driving members which are accelerated by gas from the gas generator;
   a passage for guiding the driving members; and
   a rotational member having a plurality of driving points which are pressed by some of the accelerated driving members to impart rotational torque,
   wherein at least one of the driving members is a ball configured to deform to prevent gas leakage toward the rotational member.

12. A pre-tensioner which rotates a take-up shaft of a seat belt retractor in the belt take-up direction to impart pre-tension on a belt in case of emergency, the pre-tensioner comprising:

a gas generator;

a plurality of driving members which are accelerated by gas from the gas generator;

a passage for guiding the driving members; and a rotational member having a plurality of driving points which are pressed by some of the accelerated driving members to impart rotational torque, wherein the driving member positioned farthest from the rotational member is a ball configured to deform in response to the gas from the gas generator forcing the driving member into the adjacent driving member.

13. A pre-tensioner which rotates a take-up shaft of a seat belt retractor in the belt take-up direction to impart pre-tension on a belt in case of emergency, the pre-tensioner comprising:

a gas generator;

a plurality of driving members which are accelerated by gas from the gas generator;

a passage for guiding the driving members; and a rotational member having a plurality of driving points which are pressed by some of the accelerated driving members to impart rotational torque, wherein the driving member nearest the gas generator is a ball configured to contact an inner surface of the passage to prevent gas from the gas generator from leaking by.

* * * * *